United States Patent [19]

Nakajima et al.

[11] Patent Number: 5,384,632
[45] Date of Patent: Jan. 24, 1995

[54] DIGITAL COPIER ENABLING SETTING OF A PLURALITY OF COPYING CONDITIONS IN A SINGLE SETTING OPERATION BEFORE COPYING IS INITIATED

[75] Inventors: Akio Nakajima, Toyokawa; Hideo Muramatsu, Shinshiro, both of Japan

[73] Assignee: Minolta Camera Kabushiki Kaisha, Osaka, Japan

[21] Appl. No.: 128,466

[22] Filed: Sep. 28, 1993

[30] Foreign Application Priority Data

Sep. 30, 1992 [JP] Japan .................. 4-262519
Sep. 30, 1992 [JP] Japan .................. 4-262520

[51] Int. Cl.6 ........................................... G03G 15/00
[52] U.S. Cl. ............................. 355/313; 355/311
[58] Field of Search ............... 355/313, 314, 209, 311, 355/246; 346/160, 153.1; 358/296, 300, 400, 401

[56] References Cited

U.S. PATENT DOCUMENTS 4,935,771  6/1990  Ito ................................... 355/66
5,073,802  12/1991 Sugiyama .................. 355/309 X
5,206,735  4/1993  Gauronski et al. ............ 358/296

Primary Examiner—R. L. Moses
Attorney, Agent, or Firm—Willian Brinks Hofer Gilson & Lione

[57] ABSTRACT

A digital copier being provided with a memory function which enables the operator to set a plurality of copying conditions in a single setting operation before copying operations are initiated so that the copying operations are performed in series or in parallel based on the individual copying conditions being set. Even when the copying operations are ongoing, the digital copier also enables the operator to change the setting of the copying conditions such as the number of copies, magnification for copying, and paper size, along with the sorting mode, so that the copying operations are performed based on the changed conditions thereafter. Accordingly, the setting of the copying modes for every copying mode, which has conventionally been required, is not necessary any more. This improves copying efficiency and also realizes flexible operation even when a plurality of copying modes are set, so that the copying function of the digital copier is significantly improved.

8 Claims, 38 Drawing Sheets

Fig.10

| AREA | PAGE | FORE-CONCATENATION | AFT-CONCATENATION | ADDITIONAL DATA |
|---|---|---|---|---|
| 00 | 1 | 00 | 01 | 1st MODE |
| 01 | 1 | 01 | FF | 1st MODE |
| 02 | 1 | 00 | 03 | 2nd MODE |
| 03 | 1 | 03 | FF | 2nd MODE |
| . . . . | | | | |

MT1

NORMAL
SINGLE SIDE /
SINGLE SIDE
MODE

DOUBLE SIDE
MODE

2IN-1 MODE

DIGITAL COPIER ENABLING SETTING OF A PLURALITY OF COPYING CONDITIONS IN A SINGLE SETTING OPERATION BEFORE COPYING IS INITIATED

BACKGROUND OF THE INVENTION

1. Field of the Invention

The present invention relates to a digital copier being provided with a memory function which enables a plurality of copying conditions to be set by a single setting operation before copying operations are initiated and which also enables the copying conditions to be changed during the copying operations.

2. Description of Related Art

With conventional analog copiers or digital copiers without a memory function, an operator is expected to set a plurality of conditions relating to copying, such as the number of copies, sorting or non-sorting, and image quality, before pressing a start key. In the case where the operator notices an error in the setting of the copying conditions, he or she is expected to press a clear/stop key or the like immediately, wait for the current copying operation to be completed, reset the copying conditions, and then press the start key again so as to resume copying. In the case where sorting is to be performed, the document is discharged after it is scanned to provide the specified number of copies.

Thus, the conventional analog copiers or digital copiers without a memory function are disadvantageous in that, when an error is noticed in the setting of the copying conditions after the copying is initiated, a considerable period of time is required to resume the copying. Moreover, since the document is discharged while sorting is being performed, it is substantially impossible to change the number of copies after the copying is initiated.

Some of these conventional copiers are provided with various functions convenient for operators, among which are: an automatic paper selecting function for automatically detecting the size of the document being set and selecting the proper paper to be printed in accordance with the detected size; an automatic magnification selecting function for automatically detecting the size of the document being set and setting the magnification for copying in accordance with the paper to be printed; a parallel copying function based on a 2in-1 mode; and a double-side copying function. In the case where a plurality of copies are to be produced for a document, it may be required to selectively vary the copying magnification for some of the copies or to produce copies in parallel based on the 2in-1 mode as well as to produce all the copies in the same mode. For example, it may be preferred in a record of proceedings to print a notice of holding a conference and its agenda on a sheet of paper for some copies, while, for the other copies, printing the notice of holding the conference on one half of a sheet so that the other blank half is used for taking notes. This type of copying can be performed by utilizing the parallel copying in the 2in-1 mode. Or it may be preferred to print a document image on one side of a sheet for some copies while printing it on both sides of a sheet for the other copies.

The above-mentioned parallel copying in the 2in-1 mode can be performed by means of an automatic two-document feeder. Typically, two documents are automatically fed and set on an document stand so that they are printed in parallel on a single sheet of paper. When the documents are of A4 size, for example, they are copied in parallel on a A3-sized sheet of paper. Furthermore, it is also possible to copy the two documents in parallel on a A4-sized sheet by reduction, if designated as such.

In the case where copying is to be performed by varying the copying modes for different purposes, the conventional copiers are disadvantageous, as described above, in that they require the following procedures. That is, after copying is performed in a copying mode, the operator is required to reset the document on the document stand and change the current copying mode to another copying mode before resuming the copying. It is impossible with the conventional copier to set a plurality of modes by a single setting operation. Hence, the conventional copier cannot save the labor of resetting the document and the intricate operation of changing modes after the copying operation in the first mode is completed.

There is another type of conventional copier being provided with a circulation-type automatic document refeeder for automatically refeeding the document that has been discharged after its image was scanned. With such a conventional apparatus, it is possible, to some extent, to perform copying operations in a plurality of copying modes if paper for sorting jobs in accordance with the jobs is used to specify the jobs. However, it is also impossible to save the intricate operations of setting the document-sorting paper together with a group of documents and of removing it after the copying. Moreover, since it is required to equip the copier with an extra device for detecting the document sorting paper, the constitution of the copier becomes complicated accordingly.

In a conventional analog copier, on the other hand, the scanning of an document should be performed in synchronism with a copying operation, so that the scanning operation should be repeated by the number of copies being set. This causes the reduction in lifetime of the copier, and the problems of a noise during the copying operations and increased power consumption of the copier are inevitably caused.

SUMMARY OF THE INVENTION

The present invention has been achieved in the light of such circumstances. An object of the present invention is to provide a digital copier which enables an operator to easily set a plurality of copying conditions, such as a copying mode and copying magnification, by a single setting operation before copying operations are initiated and which also enables the operator to easily change the copying conditions and sorting modes even during the copying operations, so that the copying operations in a plurality of copying modes can advantageously be performed.

The above object can be attained with a digital copier being provided with a memory function, comprising: copying condition setting means for setting a plurality of copying conditions with respect to the same series of documents before copying operations are initiated; copying control means for controlling the copying operations so that the copying operations are performed in accordance with the individual copying conditions being set; and image forming means for forming images in accordance with the individual copying conditions being set.

In the digital copier as set forth, the copying control means can control the copying operations so that the copying operations in accordance with the individual copying conditions are performed in series.

In the digital copier as set forth, the copying control means can further control the copying operations so that the copying operations in accordance with the individual copying conditions are performed in parallel.

The above object can also be attained with a digital copier being provided with a memory function, comprising: copying condition setting means for setting a plurality of copying conditions with respect to the same series of documents before copying operations are initiated; copying condition changing means for changing the copying conditions being set during the copying operations; copying control means for controlling the copying operations so that the copying operations are performed in accordance with the individual copying conditions being set and that, when the copying conditions are changed during the copying operations, the copying operations are performed in accordance with the changed copying conditions; and image forming means for forming images in accordance with the individual copying conditions being set or with the changed copying conditions.

In the digital copier as set forth, the copying condition changing means can change at least the number of copies among the copying conditions.

In the digital copier as set forth, the copying condition changing means can further change the magnification for copying.

In the digital copier as set forth, the copying condition changing means can further change the size of paper to be printed.

In the digital copier as set forth, the copying condition changing means can further change the mode for sorting.

The above object can also be attained with a digital copier being provided with a memory function, comprising: copying mode setting means for setting first and second copying modes which are different in copying conditions; copying mode storing means for storing the first and second copying modes being set; copying control means for controlling copying operations so that the copying operations in accordance with the first copying mode being stored are performed in series and that the copying operations in accordance with the second copying mode being stored are performed in series; and image forming means for forming images in accordance with the first or second copying mode being stored.

With the digital copier thus constituted, copying operations in a plurality of copying modes can be performed by a single setting operation prior to the copying and the copying conditions or sorting modes can also be changed with ease even during the copying operations. This enables the efficient and convenient operation of the copier, so that the total production of the copiers can significantly be increased.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 10 is a view showing an example of the constitution of a control table for controlling an image memory and a code memory;

DESCRIPTION OF THE PREFERRED EMBODIMENT

In the following, an embodiment of the present invention will specifically be described with reference to the drawings.

Figure 1:
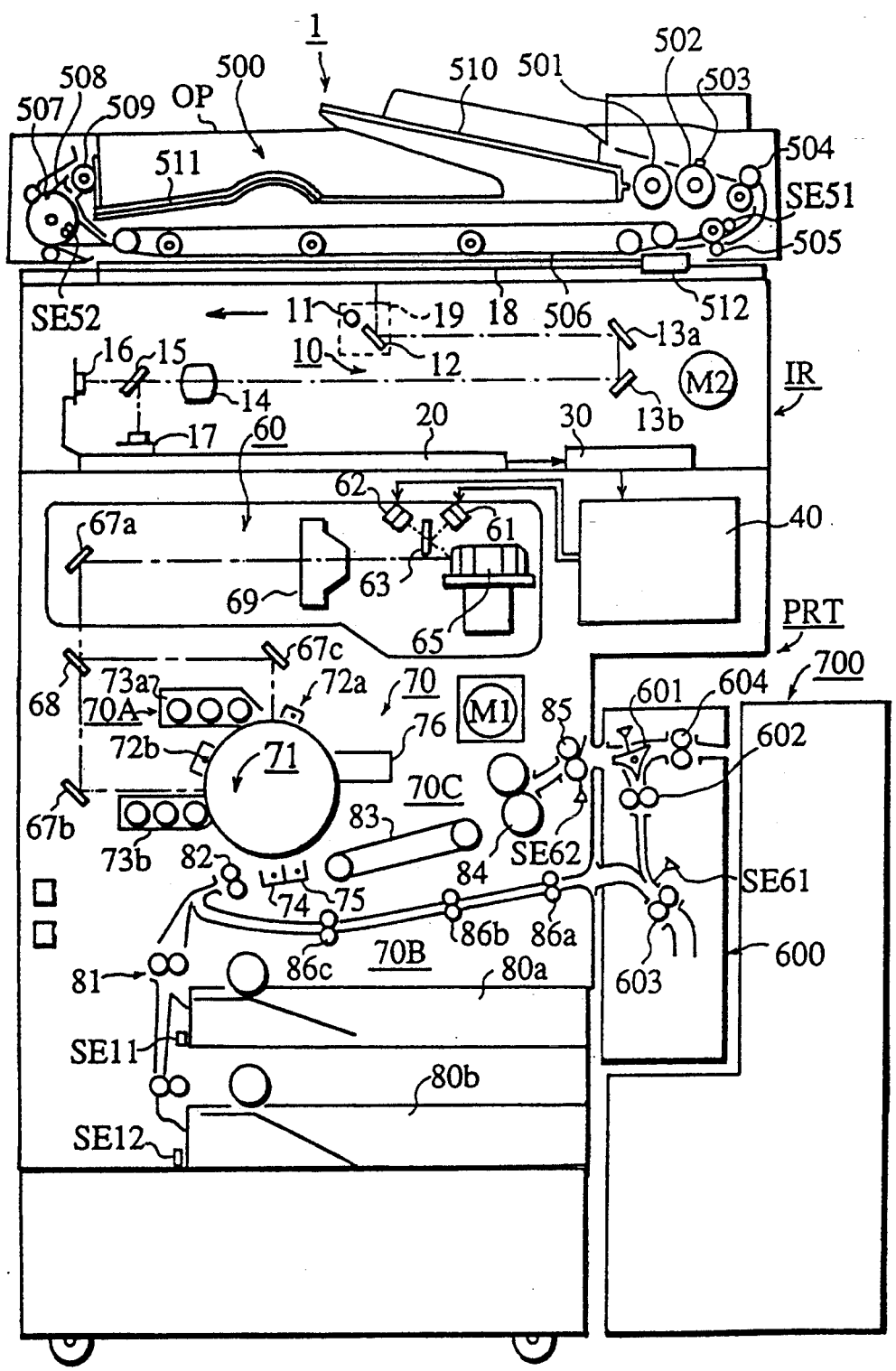
FIG. 1 is a frontal cross section showing the whole constitution of a digital copier according to the present invention.

FIG. 1 is a frontal cross section showing the whole constitution of a digital copier according to the present invention. The digital copier 1 comprises a scan system 10 for scanning an original document and converting it to an image signal, an image signal processor 20 for processing the image signal transmitted from the scan system 10, a memory unit 30 for storing the image data inputted from the image signal processor 20, an optical system 60 for guiding two laser beams from two semiconductor lasers 61 and 62 to different exposure positions on a photosensitive drum 71 on the basis of the image data inputted from the memory unit 30, an image formation system 70 for forming an image by developing a latent image formed by exposure, transferring it onto paper, and fixing it thereto, an operation panel OP disposed on the upper surface of the main body of a copying apparatus 1, a document transporter 500 for transporting the document and turning it over if necessary, a paper refeeder 600 for refeeding paper to a transfer position, and a sorter 700 for sorting the discharged sheets of paper onto bins.

The scan system 10 and image signal processor 20 constitute a reader IR, while a print processor 40, the optical system 60, and image producing system 70 constitute a printer PRT.

The scan system 10 comprises an exposure lamp 11 mounted in a scanner 19 which is movable beneath a glass document stand 18, first mirror 12, second mirror 13a, third mirror 13b, condenser lens 14, dichroic mirror 15, opto-electric converters 16 and 17 composed of a CCD array, and a scan motor M2.

Of reflected light from the document, the dichroic mirror 15 reflects light of a specific color, e.g. red, while it permeates light of the complementary color of the specific color. The opto-electric converters 16 and 17 convert an image of a non-specific color having much black and an image of a specific color (red) to electric signals, respectively.

The image signal processor 20 processes the image signals outputted from the two opto-electric converters 16 and 17, differentiates the pixels forming the document image into a specific color (second color) and into colors (first color) other than the specific color, and outputs image data including color data to the memory unit 30. The memory unit 30 will be described later.

The print processor 40 selectively directs the image data including the color data to the two semiconductor lasers 61 and 62 while delaying the image data given to the semiconductor laser 62 in accordance with the difference in exposure positions corresponding to the two semiconductor lasers 61 and 62.

The optical system 60 comprises the semiconductor lasers 61 and 62, a dichroic mirror 63 for synthesizing two laser beams from the semiconductor lasers 61 and 62, polygonal mirror 65 for deflecting the synthesized laser beam, main lens 69, reflecting mirror 67a, dichroic mirror 68 for resolving the synthesized laser beam into the original two laser beams, and reflecting mirrors 67b and 67c.

The image formation system 70 comprises a development transfer system 70A, transport system 70B, fixation system 70C, and main motor M1.

The development transfer system 70A comprises a photo-sensitive drum 71 which is driven to rotate clockwise in FIG. 1. It also comprises a first electrifying charger 72a, first developing device 73a, second electrifying charger 72b, second developing device 73b, transfer charger 74, separating charger 75, and cleaner 76, which are successively disposed around the photosensitive drum 71 from the upstream side of its rotating direction.

The first developing device 73a contains a two-component developer composed of a red toner and carrier corresponding to the second color. The second developing device 73b contains another two-component developer composed of a black toner and carrier corresponding to the first color.

The transport system 70B comprises cassettes 80a and 80b for containing paper, size detecting sensors SE11 and SE12 for detecting the size of paper, paper guide 81, timing roller 82, conveyance belt 83, and horizontal transport rollers 86a, 86b, and 86c for transporting paper fed from the paper refeeder 600.

The fixation system 70c comprises a fixing roller 84 for transporting paper by way of thermocompression, discharge roller 85, and discharge sensor SE62 for detecting the discharging of paper.

The paper refeeder 600 is of circulating type, which temporarily withholds the paper discharged from the discharge roller 85, turns it over in the case of a double side mode or does not turn it over in the case of a synthesis mode, and then delivers it to the horizontal transport roller 86a so that the paper is subjected to another image formation (print). The paper refeeder 600 comprises a switching claw 601 for switching between the discharging of paper to the sorter 700 and the refeeding of paper, transport roller 602, turn over roller 603, discharge roller 604, and turn over sensor SE61.

In the double-side mode, the left end portion of the switching claw 601 is moved upward by a solenoid (not shown), and the paper discharged from the discharge roller 85 is thereby guided toward the transport roller 602 so as to reach the turn over roller 603 via the transport roller 602.

When the rear end of the paper reaches the turn over sensor SE61, the reverse roller 603 is reversely rotated, and the paper is thereby transported toward the horizontal transport roller 86a, so as to reach the timing roller 82 via the horizontal transport rollers 86b and 86c and wait there. Meanwhile, other sheets of paper are sequentially being transported at a regular interval. In the case where the image data is not delayed, the number of sheets which can be awaited by the paper with its one side printed depends on the length of paper.

The document transporter 500 automatically transports a document which has been set on a document feed tray 510 onto the glass document stand 18 and discharges the document to a document discharger 511 after the document is scanned by the scanner 19.

The document transporter 500 comprises a paper feed roller 501, separating roller 502, separating pad 503, intermediate roller 504, resist roller 505, conveyance belt 506, turn over roller 507, switching claw 508, discharge roller 509, document feed tray 510, document discharger 511, document scale 512, paper feed sensor SE51, and discharge sensor SE52.

On the document feed tray 510 is set a document set consisting of a single or plurality of sheets. In the single side mode, only one side of the document is scanned. In the double side mode, on the other hand, the document is turned over so that the both sides thereof are scanned.

In a single side mode, for example, documents being set are sequentially transported by the paper feed roller 501 from the lowermost document upward. The document transported is swept by a separating roller 502 and separating pad 503 and goes through the intermediate roller 504. Then, a resist roller 505 corrects the deviation of the document from the due position, so that the document is transported onto the glass document stand 18 by the conveyor belt 506, which slightly moves reversely and stops immediately after the rear end of the document went through the left end of the document scale 512. The right end (rear end) of the document is thereby brought onto the edge of the document scale 512, so that the document is precisely aligned on the glass document stand 18.

Then, the scanner 19 scans the undersurface of the document on the glass document stand 18 so as to read data thereon. When the reading operation is completed, the document is transported to the left by the conveyor belt 506, makes a U-turn at the turn over roller 507, and goes above the switching claw 508 so as to be discharged onto the document discharger 511 by the discharge roller 509. These procedures are repeated until there are no documents left on the document feed tray 510.

The image data of the document is stored in a memory (image memory 304 or code memory 306, which will be described later) simultaneously with the reading of the document. By reading a series of documents being set, a job of reading a set of documents is completed. The image data of a set of documents stored in the memory is controlled as a sentence.

Figure 2:
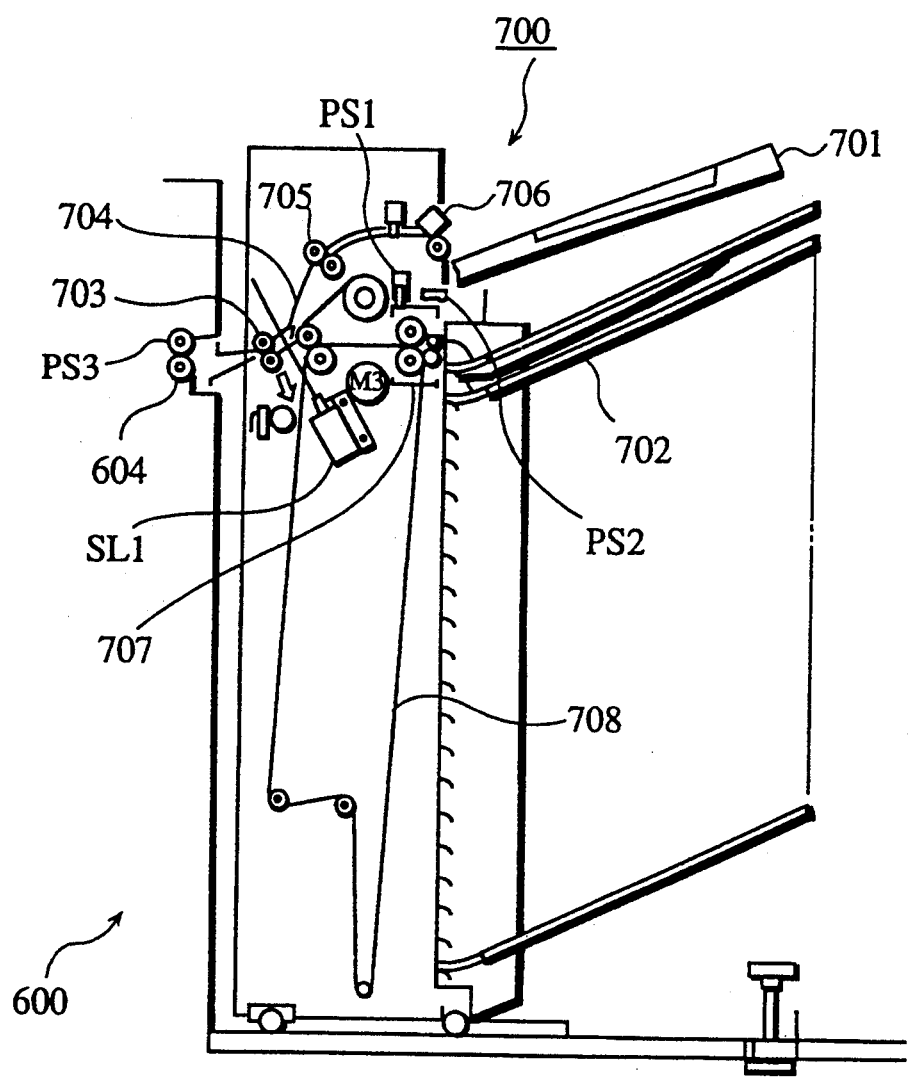
FIG. 2 is a frontal cross section showing the constitution of a sorter 700 of FIG. 1 in detail.

FIG. 2 is a frontal cross section showing the constitution of the sorter 700 of FIG. 1 in detail. The sorter 700 is disposed on one side of the paper refeeder 600 of FIG. 1 so as to sort out the printed paper discharged by the discharge roller 604 of the paper refeeder 600 onto a plurality of sort bins 702 which are disposed in the vertical direction above or below the discharge tray 701. The sorter 700 comprises an introducing roller 703 for rolling in the printed paper discharged from the paper refeeder 600, a direction switching guide 704 for switching the transport directions of the printed paper being rolled in, a transport roller 705 and discharge roller 706 for transporting the printed paper onto the discharge tray 701, a guide unit 707 for transporting and sorting out the printed paper onto the sort bins 702, and a conveyor belt 708.

The direction switching guide 704 is switched by the on-off operation of the solenoid SL1, so that the printed paper is discharged onto the discharge tray 701 or onto the sort bin 702. The guide unit 707 is driven to move up and down by a discharge bin switching motor M3, so that the printed paper is sorted onto a predetermined sort bin 702. The uppermost position of the guide unit 707 moving up and down is detected by a top bin detecting sensor PS1. Paper jam is detected by a jam detecting sensor PS2. The discharging of the printed paper by the discharge roller 604 is detected by a discharge detecting sensor PS3.

Figure 3:
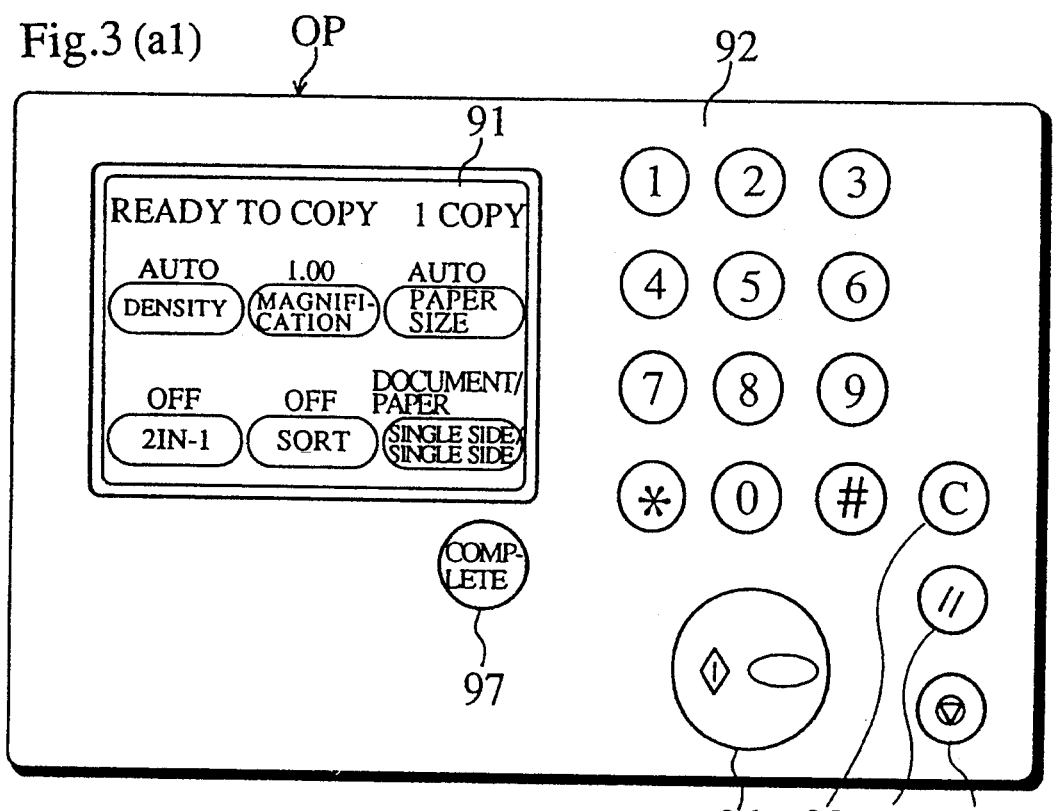
FIG. 3(a1) is a plan view showing an operation panel and which illustrates an initial screen of a liquid crystal panel thereof, and FIGS. 3(a2), 3(a3) and 3(a4) illustrate further screens of the liquid crystal panel.

FIG. 3 is a plan view showing the operation panel of the digital copier according to the present invention. The operation panel OP is provided with a liquid-crystal touch panel 91, ten key 92 for inputting the number of copies or magnification, clear key 93 for resetting the number of copies to the standard number "1", panel reset key 94 for resetting the values set in the copying apparatus 1 to the standard values, stop key 95 for stopping the copying operations, start key 96 for starting the copying operations, and setting completion key 97 for showing the completion of the setting of copying conditions. The liquid-crystal touch panel 91 displays a variety of states of the copying apparatus 1 such as the generation of paper jam, maintenance staff calling, and paper empty, the operating modes of the copying apparatus 1 such as exposure level, magnification, and paper size, and other information as well as it is used for inputting data so as to select the operating mode.

The liquid-crystal panel 91 of the operation panel OP shown in FIG. 3(a1) exhibits its initial screen on which are displayed a message of "READY TO COPY", "1 COPY" for designating 1 as the standard number of copies, "DENSITY, AUTO" for automatically adjusting density, "MAGNIFICATION, 1.00" for automatically adjusting magnification, "PAPER SIZE, AUTO" for automatically selecting paper to be printed, "2IN-1, OFF" for not selecting the 2in-1 operation, "SORT, OFF" for not selecting the sorting operation, and "DOCUMENT/PAPER, SINGLE SIDE/SINGLE SIDE" for selecting the copying modes of the document and paper, respectively.

The 2in-1 mode is for copying two documents on a single sheet of paper. Typically, when the 2in-1 mode is selected, two documents are automatically transported and set on the document stand by an automatic two-document feeder. If the size of the documents is A4, they are copied in parallel on a single sheet of A3-sized paper. If reduction is designated, it is also possible to copy the two documents in parallel on a single sheet of A4-sized paper.

When an operator touches the "paper size" sign, for example, on the initial screen (a1) of the liquid-crystal touch panel 91, the screen is switched to the one shown in FIG. 3(a2). The screen obtained is for selecting the size of paper to be printed, on which are displayed "AUTO", "A3", "A4, LATERAL (represented by a rectangle extending laterally in the drawing)", "A4, LONGITUDINAL (represented by a rectangle extending longitudinally in the drawing)", and "B5", each showing a paper size in the drawing. On the left side of these signs are displayed marks ("▷" marks in the drawing, each indicating the sign on its right). The screen also displays "SELECT" and "SET" signs in the bottom portion thereof. The operator can obtain the desired paper size by sequentially pressing the "SELECT" sign. The setting of the paper size can be achieved by pressing the "SET" sign which is on the right side of the "SELECT" sign.

Alternatively, if the operator touches the "2IN-1" sign on the screen (a1), the screen is switched to the one shown in FIG. 3(a3). Or, if the operator touches the "SINGLE SIDE/SINGLE SIDE" sign, the screen is switched to the one shown in FIG. 3(a4). If the operator touches "DENSITY", "MAGNIFICATION", or "SORT" sign, the screen is also switched to its corresponding screen, though the drawings thereof are omitted here. In this way, the operator can select the desired copying mode for each item.

Figure 4:
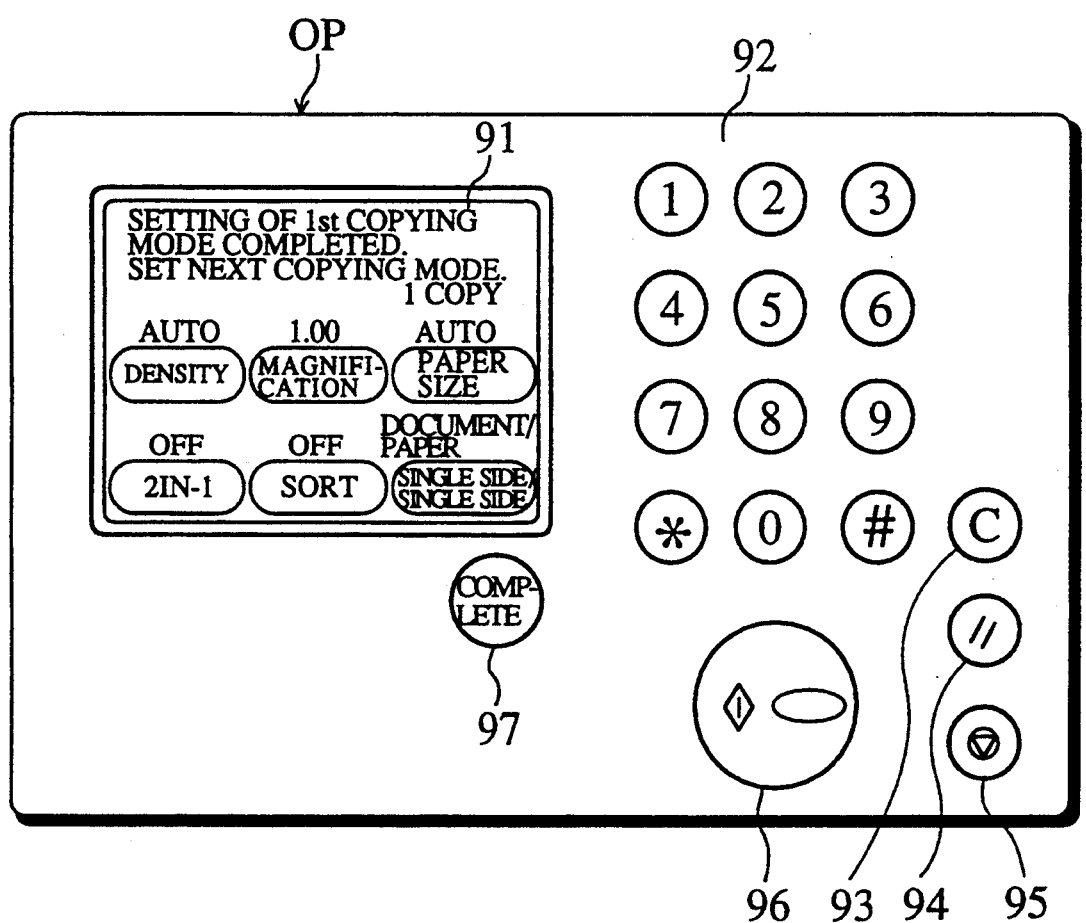
FIG. 4 is another plan view showing the operation panel.

FIG. 4 is a plan view similarly showing the operation panel OP, in which the liquid-crystal touch panel 91 displays a standard screen for setting the second mode when a plurality of modes are to be set before the copying operations are initiated. In the top portion of the screen is displayed a massage of "SETTING OF 1st COPY MODE COMPLETED. SET NEXT COPYING MODE". The next mode can be set in accordance with the same procedures as illustrated in FIG. 3.

Figure 5B:
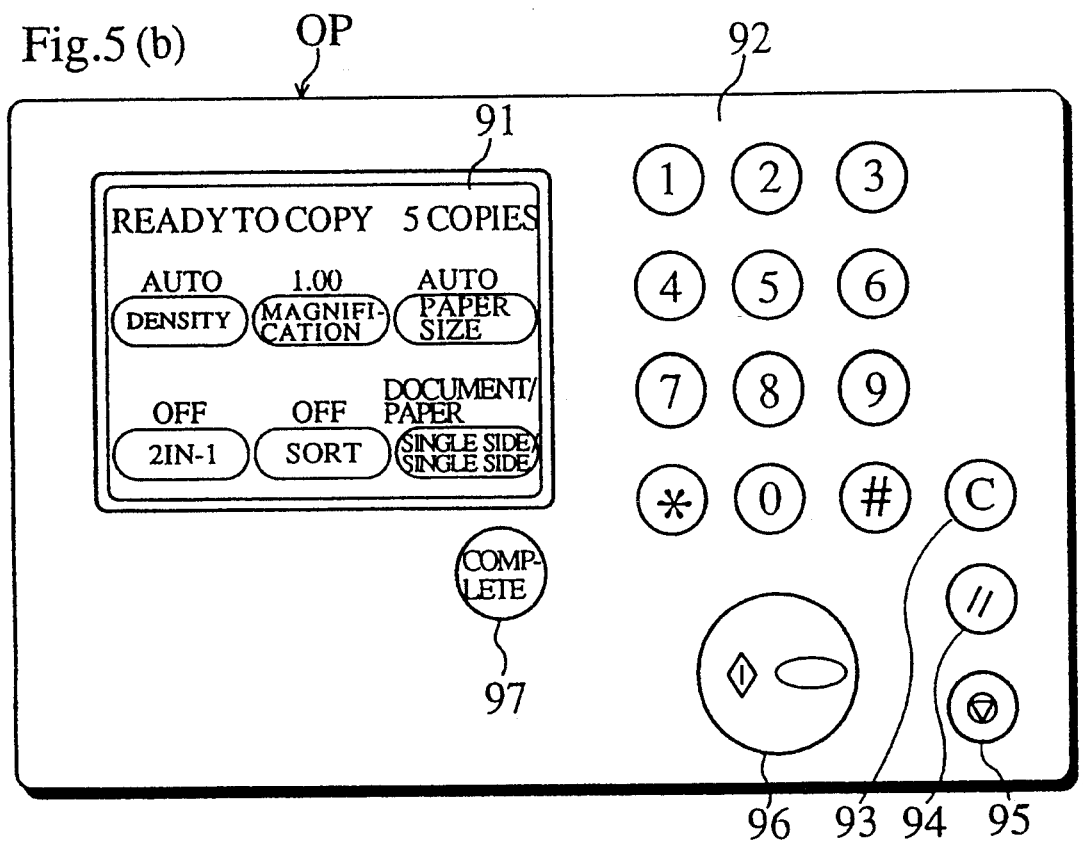
FIGS. 5(b) and 5(c) are still other plan views showing the operation panel.

FIGS. 5 and 6 are plan views similarly showing the operation panel OP. The liquid-crystal touch panel 91 of the operation panel OP shown in FIG. 5(b) exhibits the screen when the number of copies is set to 5 via the ten key 92. In the top line of the screen is displayed a massage of "READY TO COPY" with "5 COPIES" sign on its right side for representing the number of copies being set. Below the top line are displayed "DENSITY, AUTO", "MAGNIFICATION, 1.00", "PAPER SIZE, AUTO", "2IN-1, OFF", "SORT, OFF", and "SINGLE SIDE/SINGLE SIDE, DOCUMENT/PAPER", similarly in FIG. 3(a1). In this way, the operator can set the copying modes by simply inputting the desired modes through the operation panel OP during the standby time during which the copying operation is not performed.

Figure 5C:
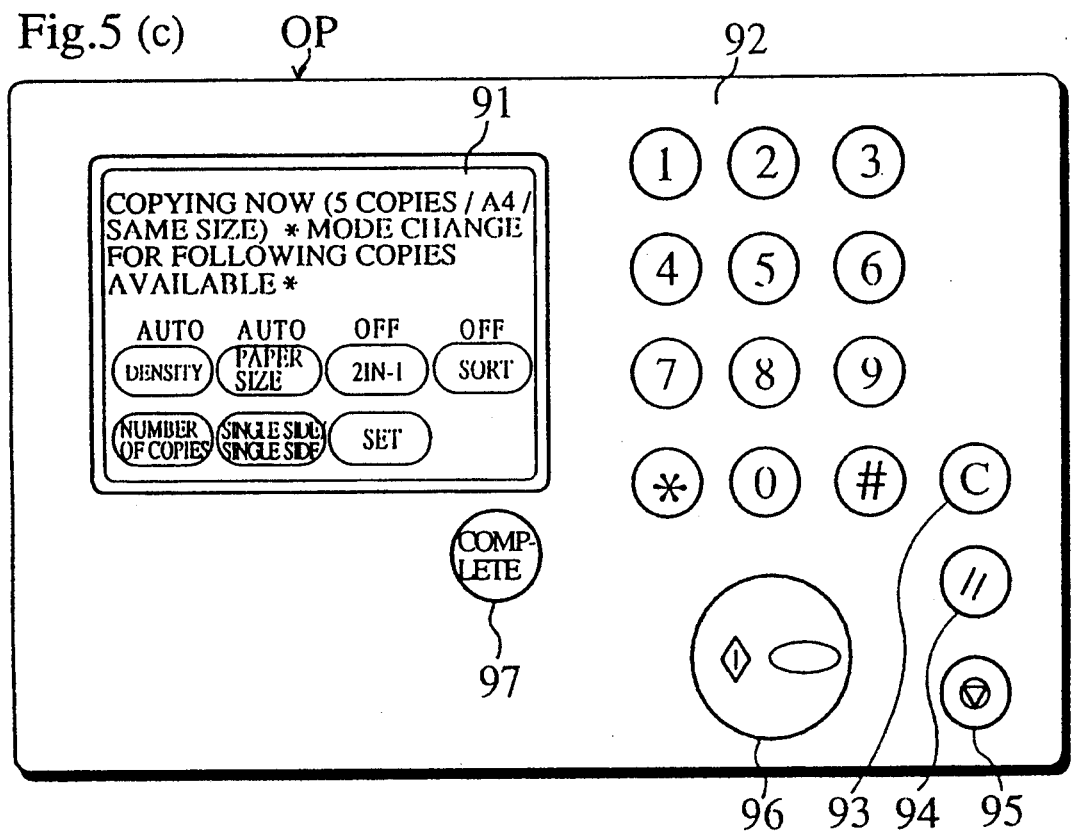

The liquid-crystal touch panel 91 shown in FIG. 5(c) exhibits the screen when the copying operation is being performed after turning the start key 96 on in the operation panel OP of FIG. 5(b). In the top line of the screen is displayed a message of "COPYING NOW" with an "A4" sign in its right side for representing the paper size selected by an APS (Auto Paper Selector) based on the paper size data obtained by reading the first document. Along with the "A4" sign, there are also displayed the "5 COPIES" for representing the number of copies and "SAME SIZE" for representing the magnification.

After the first document is read, the size data (e.g., A4, Same Size or A4, 0.707) can be obtained from the image data stored in the memory, so that the modes which can be changed in the next and subsequent copying operations are displayed in accordance with the size data. Specifically, a message of "*MODE CHANGE FOR FOLLOWING COPIES AVAILABLE*" is displayed in the upper middle portion of the screen, while the "DENSITY, AUTO", "PAPER SIZE, AUTO", "2IN-1, OFF", "SORT, OFF", "NUMBER OF COPIES", AND "SINGLE SIDE/SINGLE SIDE" signs are displayed in the lower portion of the screen as the changeable items, along with the "SET" key. If the copying mode is to be changed, the operator selects the desired mode by pressing the items being displayed and presses the "SET" key when the selection is completed. Thus, the copying modes for the following copies can be set.

Figure 6D:
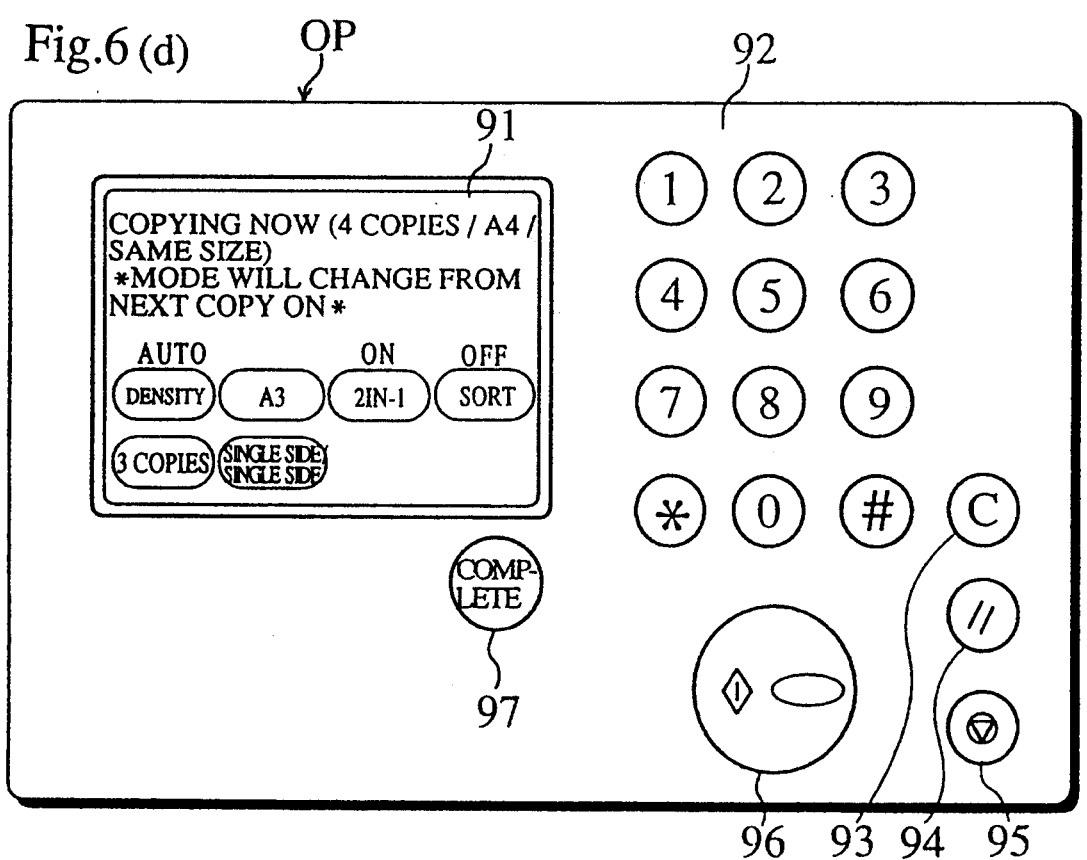
FIGS. 6(c) and 6(d) are still other plan views showing the operation panel.

The liquid-crystal touch panel 91 shown in FIG. 6(d) exhibits the screen when the "SET" key in the operation panel OP of FIG. 5(c) was pressed. Since the copying operation has already proceeded from the first copy to the second copy, the first and second copies are produced in accordance with the modes set in FIG. 5(b). As for the third copy, it is produced in accordance with the mode set in FIG. 5(c).

In the top line of the screen is displayed a message of "COPYING NOW" with the sign of "4 COPIES" on its right side for representing the number of copies, which is decremented by 1 because the first copy was already produced. There are also displayed the "A4" sign for representing the paper size and the "SAME SIZE" sign for representing the magnification. In the middle portion of the screen is further displayed a message of "*MODE WILL CHANGE FROM NEXT COPY ON*", and in the lower portion of the screen are displayed "DENSITY, AUTO", "A3", "2IN-1, ON", "SORT, OFF", "3 COPIES", and "SINGLE SIDE/SINGLE SIDE" signs for representing the conditions being set.

Figure 6E:
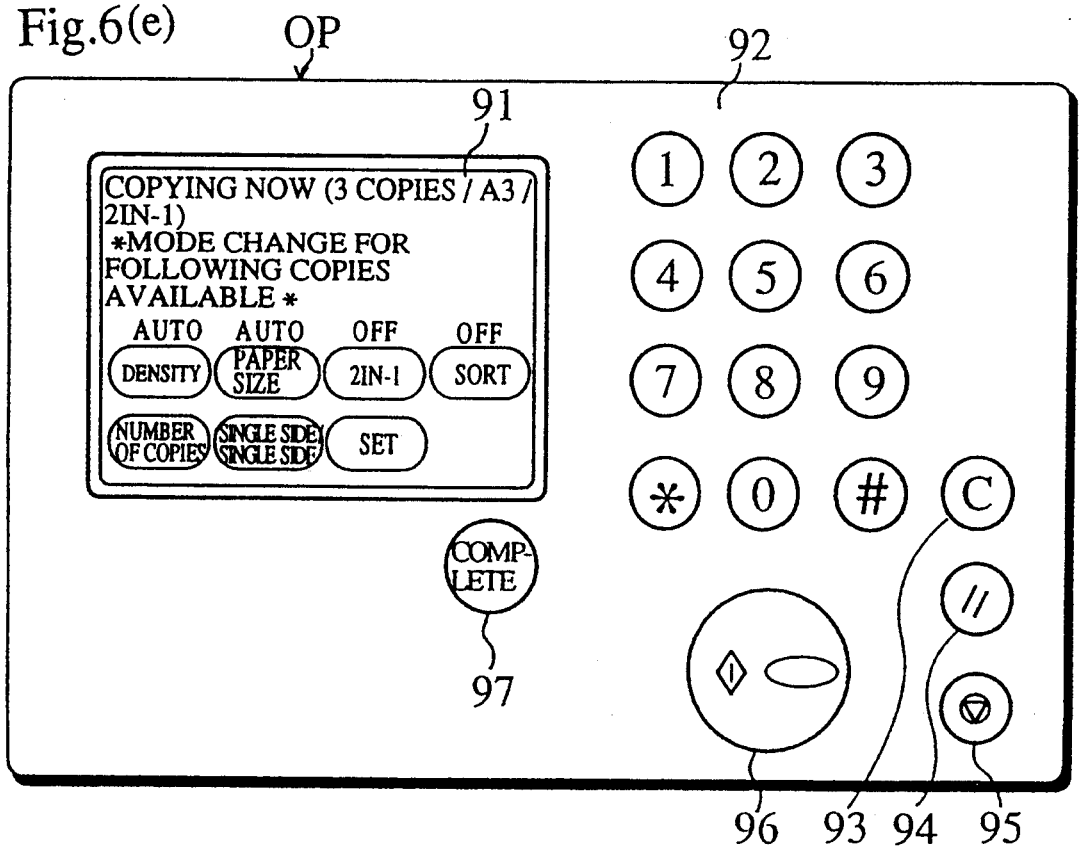

The liquid-crystal touch panel 91 of the operation panel OP shown in FIG. 6(e) exhibits the screen when the copying operation according to the screen shown in FIG. 5(d) was completed and the mode change has been achieved. Specifically, a message of "COPYING NOW" is displayed in the top line of the screen with the sign of "3 COPIES" on its right side for representing the number of copies, which is further decremented by 1 because the first and second copies were already produced. There are also displayed the "A3" sign for representing the paper size and the "2IN-1" sign which was selected. In the middle portion of the screen is further displayed a message of "*MODE CHANGE FOR FOLLOWING COPIES AVAILABLE*", and in the lower portion of the screen are displayed the "DENSITY, AUTO", "PAPER SIZE, AUTO", "2IN-1, OFF", "SORT, OFF", "NUMBER OF COPIES", and "SINGLE SIDE/SINGLE SIDE" for representing the changeable items, along with the "SET" key, similarly to FIG. 4(c).

In accordance with the procedures shown in FIG. 3(a1) to FIG. 6(e), if 4 documents of A4 size are used, for example, there will be produced two sets of copies (4×2=8 copies in total) of the same A4 size and 3 copies of A3 size, each having two of the A4-sized documents printed on its single side.

Figure 7:
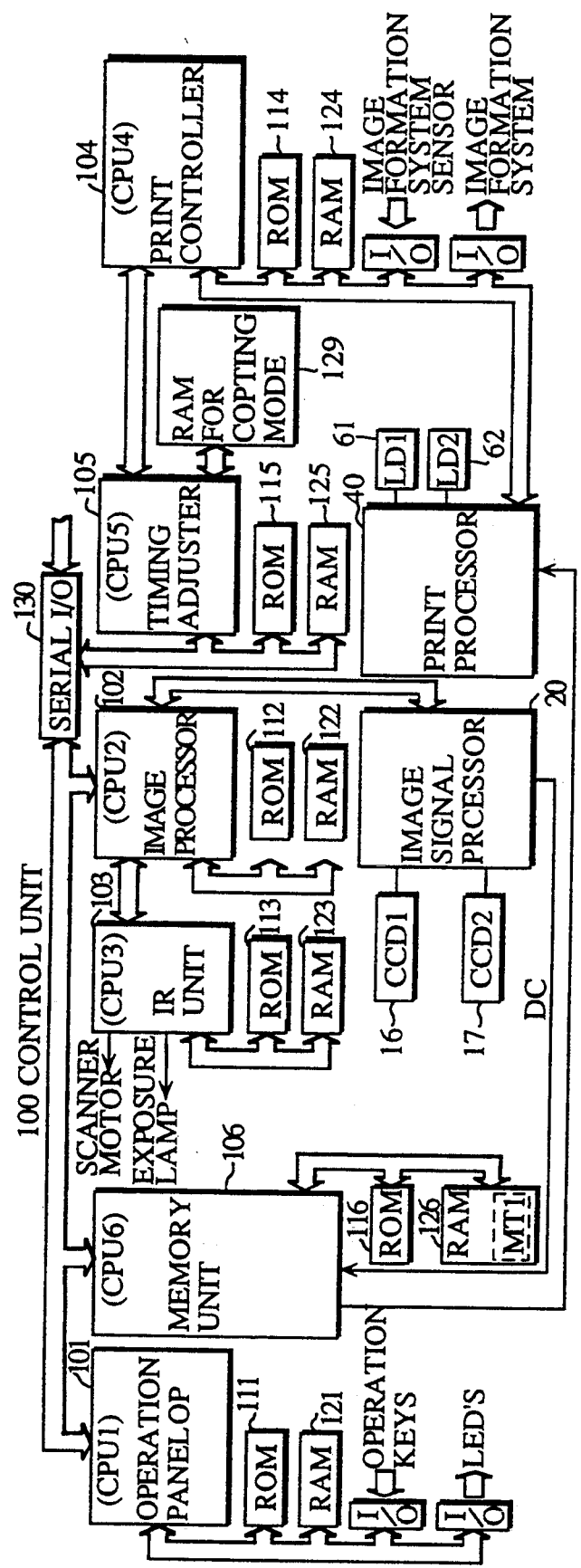
FIG. 7 is a block diagram showing the constitution of a control unit of the digital copier according to the present invention.
Figure 8:
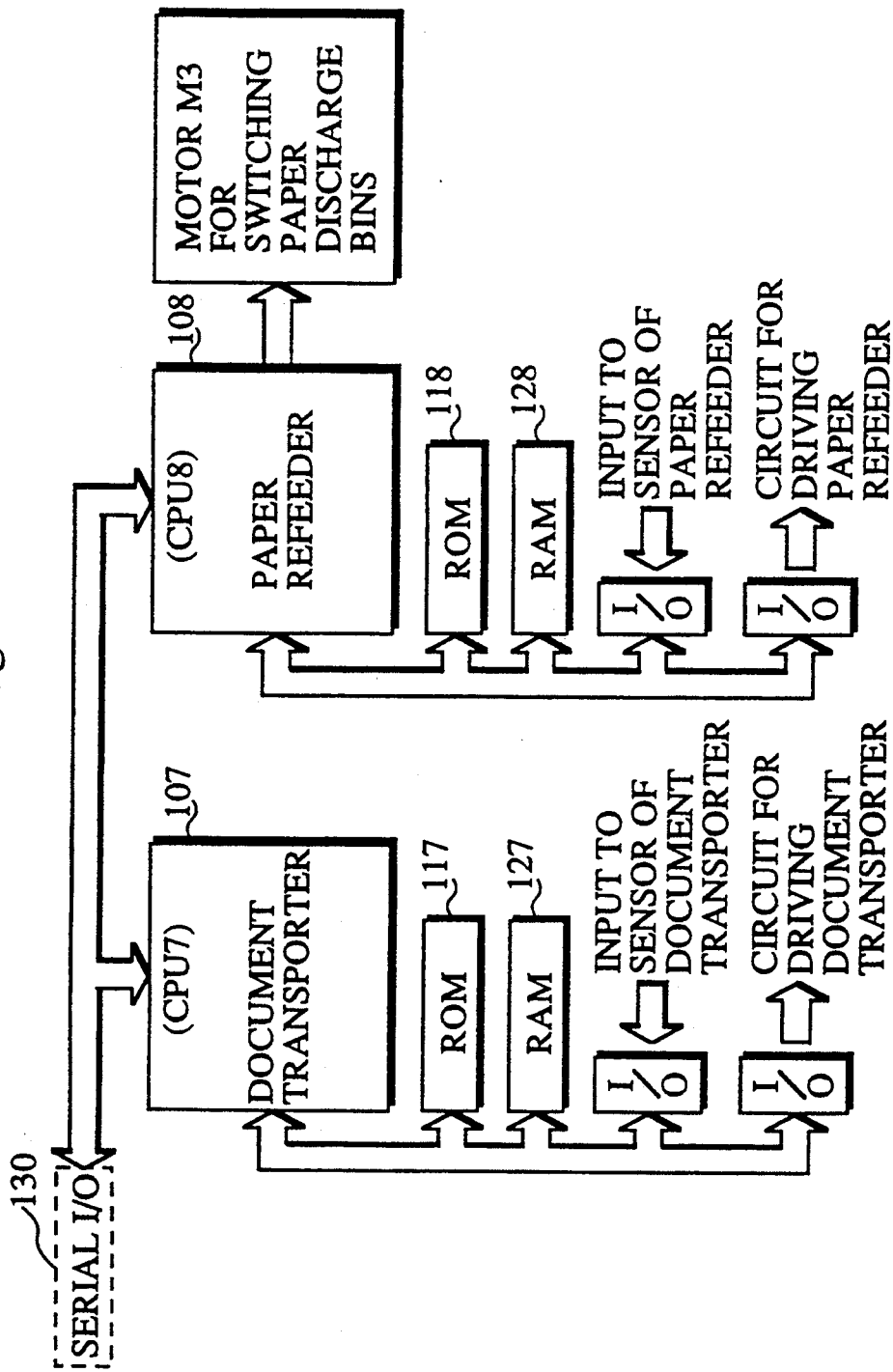
FIG. 8 is a block diagram showing the control unit of the digital copier according to the present invention, which is extended from FIG. 7.

FIGS. 7 and 8 are block diagrams showing the constitution of a control unit 100 of the digital copier according to the present invention. As shown in FIG. 7, the control unit 100 has eight CPUs 1 to 8 (CPUs 7 and 8 are shown in FIG. 8) as its main components. The CPUs 1 to 8 are provided with ROMs 111 to 118 in which their respective operating programs are stored and with RAMs 121 to 128 serving as the work areas in which the programs are executed, respectively. The CPU 6 and CPU 1 are provided in the memory unit 30 shown in FIG. 1 and in the operation panel respectively.

In FIG. 7, the CPU1 is for controlling the operation panel 101, which receives an input signal from the operation keys or buttons via the I/O and performs controlling operations associated with display. The CPU2 is for controlling the image processor 102. Specifically, it controls the image signal processor 20 for processing output signals from the two opto-electric converters 16 and 17. The CPU3 controls an IR unit 103 and drives the exposure lamp and scanner motor M2. The CPU4 drives a printing controller 104, exerts control over the image-forming system by receiving output signals from the sensor of the image formation system via the I/O, and controls the print processor 40 for controlling the two semiconductor lasers 61 and 62. The CPU5 performs processes of adjusting the overall timing of the control unit 100 and of setting the operating mode. The CPU5 is provided with a RAM 129 for the copying mode in which the copying mode sent from the CPU1 is stored. The CPU6 controls the memory unit 106 so that the image data which has been read is temporarily stored in the image memory 304 or in the code memory 306, each of which will be described later, and then read out to be outputted to the printer processor 40. The image memory 304 and code memory 306 are controlled in accordance with a control table MT1 described later.

The image signal processor 20 comprises an A/D convertor, shading corrector, color detector which detects the color of a pixel on the document based on the image data, magnification processor, and image quality corrector. The image signal processor 20 quantizes the image signals inputted from the opto-electric convertors (CCD1, CCD2) 16 and 17 into the 8-bit image data for every pixel so that they are outputted as the image data after further subjected to various processing. Together with the output data, 1-bit color data DC is also outputted so as to show whether the color of each pixel of the image data is specified one or not.

In FIG. 8, the CPU7 controls the document transporter 107 by receiving the output signal from the sensor of the document transporter via the I/O and by controlling the circuit for driving the document transporter 107. The CPU 8 also controls the paper refeeder 108 by receiving the output signal from the sensor of the paper refeeder via the I/O and by controlling the circuit for driving the paper refeeder 108, so as to drive the motor M3 for switching paper discharge bins. Among the CPUs 1 to 8, serial communication is conducted by interruption via the serial I/O 130, so that commands, reports, and other data are exchanged among them.

Figure 9:
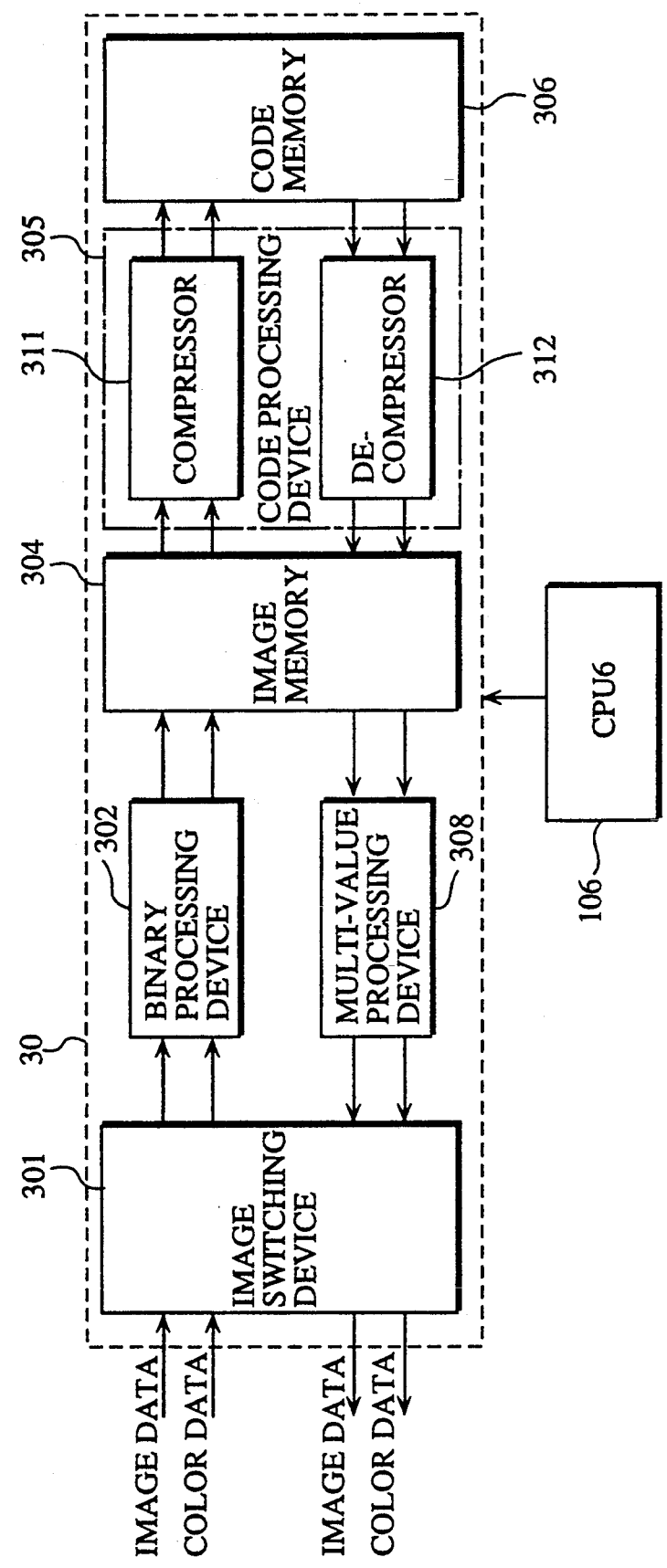
FIG. 9 is a block diagram showing the constitution of a memory unit 30 of FIG. 1.

FIG. 9 is a block diagram showing the constitution of the memory unit 30 of FIG. 1. The memory unit 30 comprises a image switching device 301, binary processing device 302 for producing binary data based on the setting of parameters obtained from the CPU6, multi-port image memory 304, code processor 305 being provided with a compressor 311 and de-compressor 312, each of which can be operated independently, multi-port code memory 306, multi-value processing device 308 for producing multi-value data based on the setting of parameters obtained from the CPU6, and the CPU6 for controlling these components.

The image switching device 301 connects or disconnects the image signals in response to a control signal. The image data stored in the image memory 304 is outputted as the image data and color data with respect to the print processor 40. The binary processing device 302 performs the process of converting the multi-value image data to the binary data in the range in which it can be restored. By way of the dither method, for example, the data is compressed by being converted from multi-value data to binary data. By contrast to the binary processing device 302, the multi-value processing device 308 estimates the multi value to be restored based on the arrangement of dots of the binary data so as to restore the original data.

When the image data is written in the image memory 304, the code processor 305 reads out the data and compresses it so as to produce the code data and write it in the image memory 304. In receiving a command from the CPU6, the code processor 305 also read out the code data written in the code memory 306 and de-compresses it so as to produce the image data and write it in the image memory 304.

When the image data for one page is produced by de-compression in the image memory 304, it is read out so that the multi-value image data is produced in the multi-value processing device 308 and outputted therefrom. The compressor 311 and de-compressor 312 are designed to operate independently and simultaneously. Between the code memory 306 and the compressor 311 or decompressor 312, data can be transmitted in the DMA mode by DMACs, which are not shown in the drawing.

As shown in FIG. 7, the code memory 306 and image memory 304 are controlled according to the control table MT1 stored in a RAM 126. FIG. 10 is a view showing an example of the constitution of such a control table MT1. The control table MT1 is used for controlling the image data or code data stored in the image memory 304, in the code memory 306, or in the both memories. The control table MT1 controls data items such as the address of compressed data stored in the code memory 306, address of non-compressed (de-compressed) data stored in the image memory 304, number for controlling data in sentences, page number, attributes such as color, and additional data being compressed which shows whether the data is stored in the code memory 306 or in the image memory 304 and whether the data is read in the first mode or in the second mode, and the like.

Figure 11:
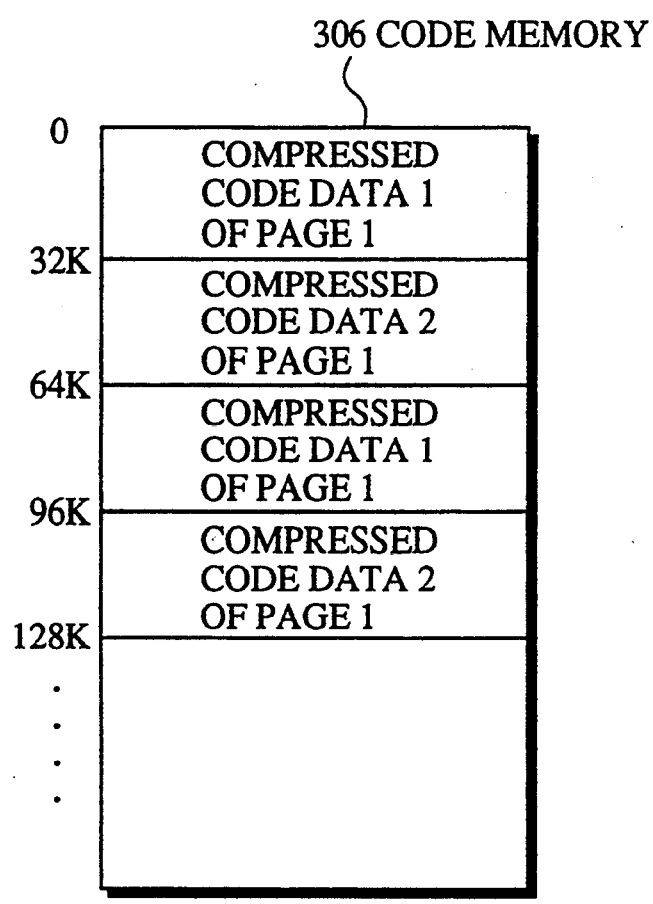
FIG. 11 is a view diagrammatically showing the data stored in the code memory which corresponds to the content of the control table.

FIG. 11 is a view diagrammatically showing the data stored in the code memory 306 corresponding to the content of the control table MT1. The code memory 306 is divided into 32K-byte memory areas. The compressed code data for one page is stored in each of the memory areas. The CPU6 reads out the image data from the image memory 304, compresses it by controlling the compressor 311, and stores it in the code memory 306, while producing the data for the control table MT1. Conversely, the CPU6 reads out the code data from the code memory 306 by following the foregoing procedures in the reverse direction, so as to output the image data. The data in the control table MT1 is erased when all the data for the corresponding page is normally printed in the required number of copies and discharged.

Figure 12:
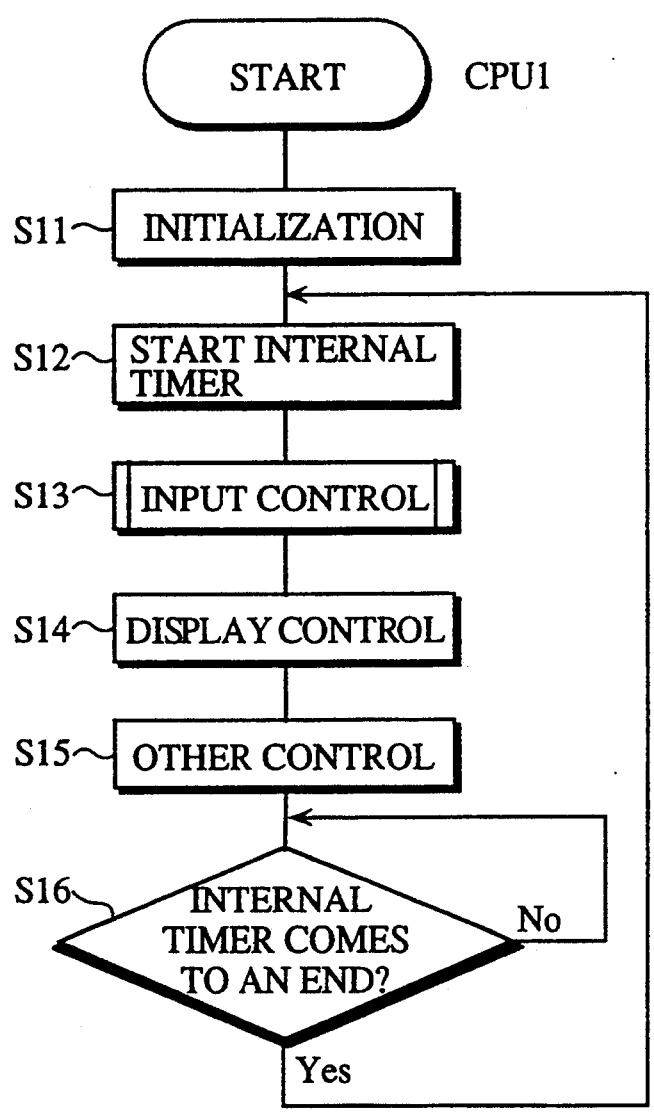
FIG. 12 is a flow chart showing a main routine executed in a CPU1 of FIG. 7.

Below, the operation of the digital copier according to the present invention will be described in detail with reference to flow charts. FIG. 12 is a flow chart showing a main routine executed in the CPU1 of FIG. 7. The CPU1 first performs initialization (S11) and then starts an internal timer so as to make sure that the routine is executed in a specified period of time (S12). Subsequently, the CPU1 performs input control process with respect to the operation panel OP and the like (S13), display control process for controlling the screen of the liquid-crystal touch panel 91 (S14), and other control processing (S15) in succession. When the end of the internal timer is confirmed (in the case of Yes in S16), the CPU1 returns to S12 and starts the internal timer again. The CPU1 is designed to communicate with other CPUs by interruption.

Figure 13:
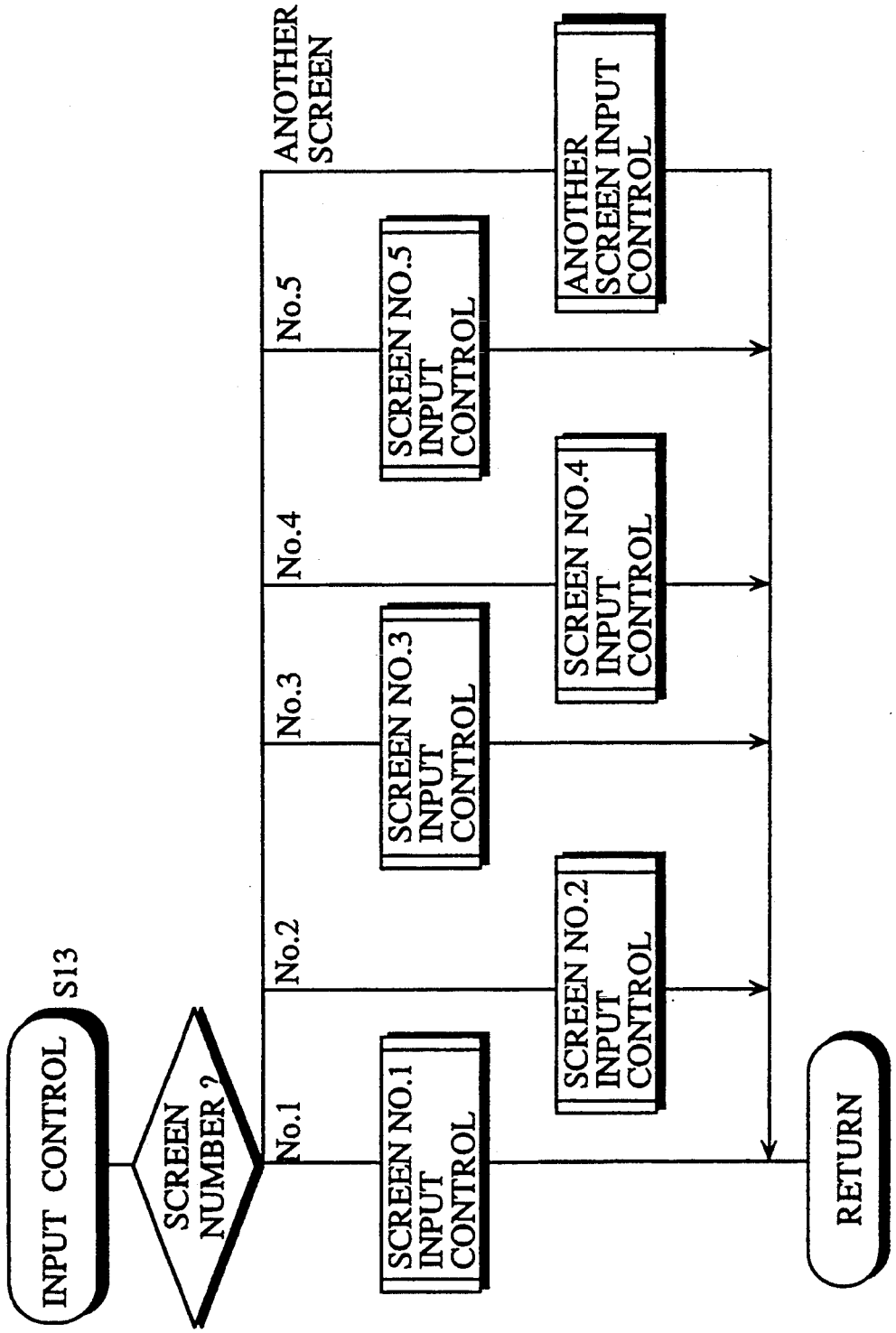
FIG. 13 is a flow chart showing input control process (S13) of FIG. 12.

Below, the control process for setting a plurality of copying conditions, such as the copying mode and magnification, by a single setting operation before the copying is started, will be described with reference to FIGS. 13 to 27. FIG. 13 is a flow chart showing the input control process of FIG. 12 (S13). Here, the CPU1 controls the screens displayed on the liquid-crystal touch panel 91 by dividing them into six screens in total, which consists of five screens Nos. 1 to 5 and another screen. That is, the screen No. 1 represents the initial screen, the screen No. 2 represents the standard screen for setting the next mode, the screen No. 3 represents the screen for setting the 2in-1 mode, the screen No. 4 represents the document/paper setting screen, and the screen No. 5 represents the paper size selecting screen. Any screen other than the screen Nos. 1 to 5 is defined as another screen. The input control for each screen is conducted by key operations which are specified on each screen.

The basic flow of control is the same: it is based on the processes of determining the mode and the number of the screen to be controlled which corresponds to the determined mode and of reporting them to the CPU 5 (the input control process on each screen). By turning on the setting completion key 97 or by turning on the start key 96, the mode and the number of the screen to be controlled are stored in the RAM provided exclusively for the copying mode in the CPU5.

Figure 14:
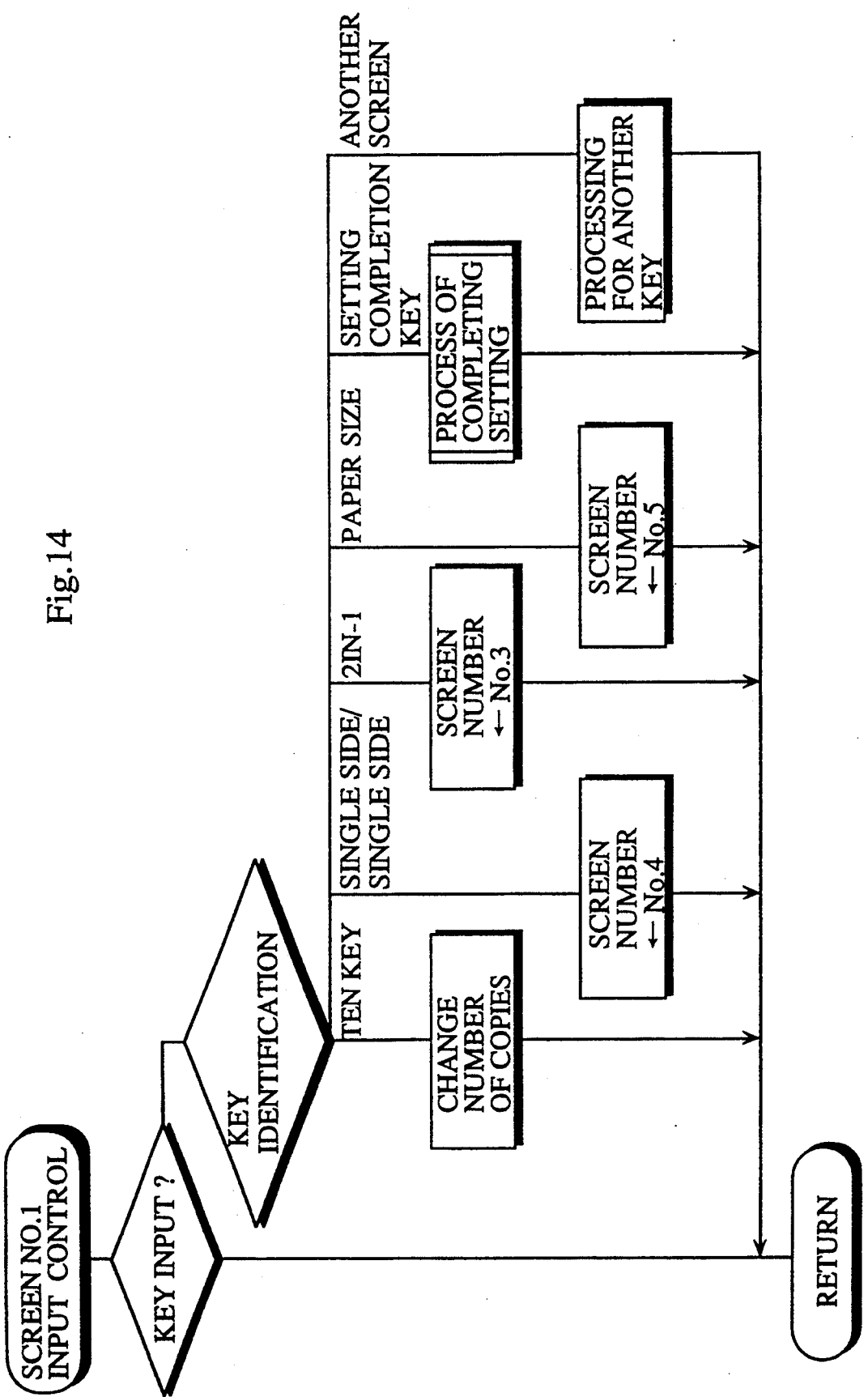
FIG. 14 is a flow chart showing input control on the screen No. 1 of FIG. 13.

FIG. 14 is a flow chart showing the input control for the screen No. 1 of FIG. 13. When there is an input by a keystroke on the screen No. 1, the process corresponding to the input is performed. After the key pressed for the input is identified, the number of copies is changed if the key pressed is the ten key, or the current screen is switched to the screen No. 4 if the key pressed is the "SINGLE SIDE/SINGLE SIDE" key displayed on the liquid-crystal touch panel 91. Alternatively, if the "2IN-1" key is pressed, the current screen is changed to the screen No. 3, or if the "PAPER SIZE" key is pressed, the current screen is changed to the screen No. 5. Furthermore, if the setting completion key 97 is pressed, the process of completing the setting is performed. If an key other than the keys mentioned above is pressed, the process corresponding to the key is performed.

As for the input control for the screen No. 2 of FIG. 13, it is completely the same as the input control for the screen No. 1 described above.

Figure 15:
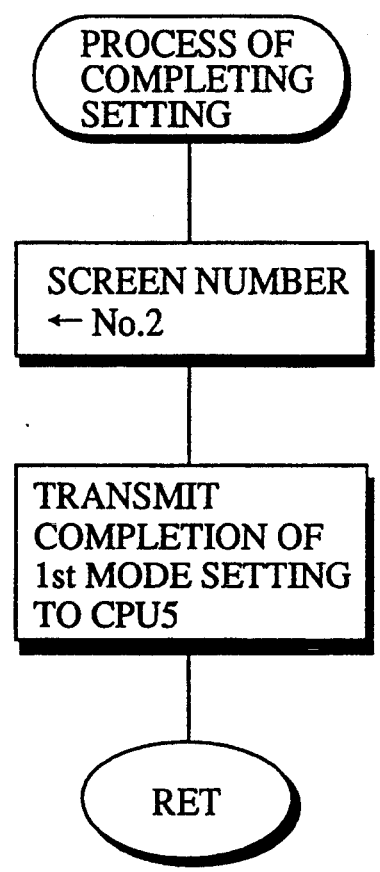
FIG. 15 is a flow chart showing the process of completing setting of FIG. 14.

FIG. 15 is a flow chart showing the process of completing the setting of FIG. 14. The process of completing the setting of FIG. 14 is performed by setting the screen No. 2 and by transmitting the completion of the setting of the first mode to the CPU5. The CPU5 receives the data and stores it as the first mode in the RAM for the copying mode. In response to the setting of the screen No. 2, the display controller displays the screen No. 2 which is the standard screen for setting the next mode.

Figure 16:
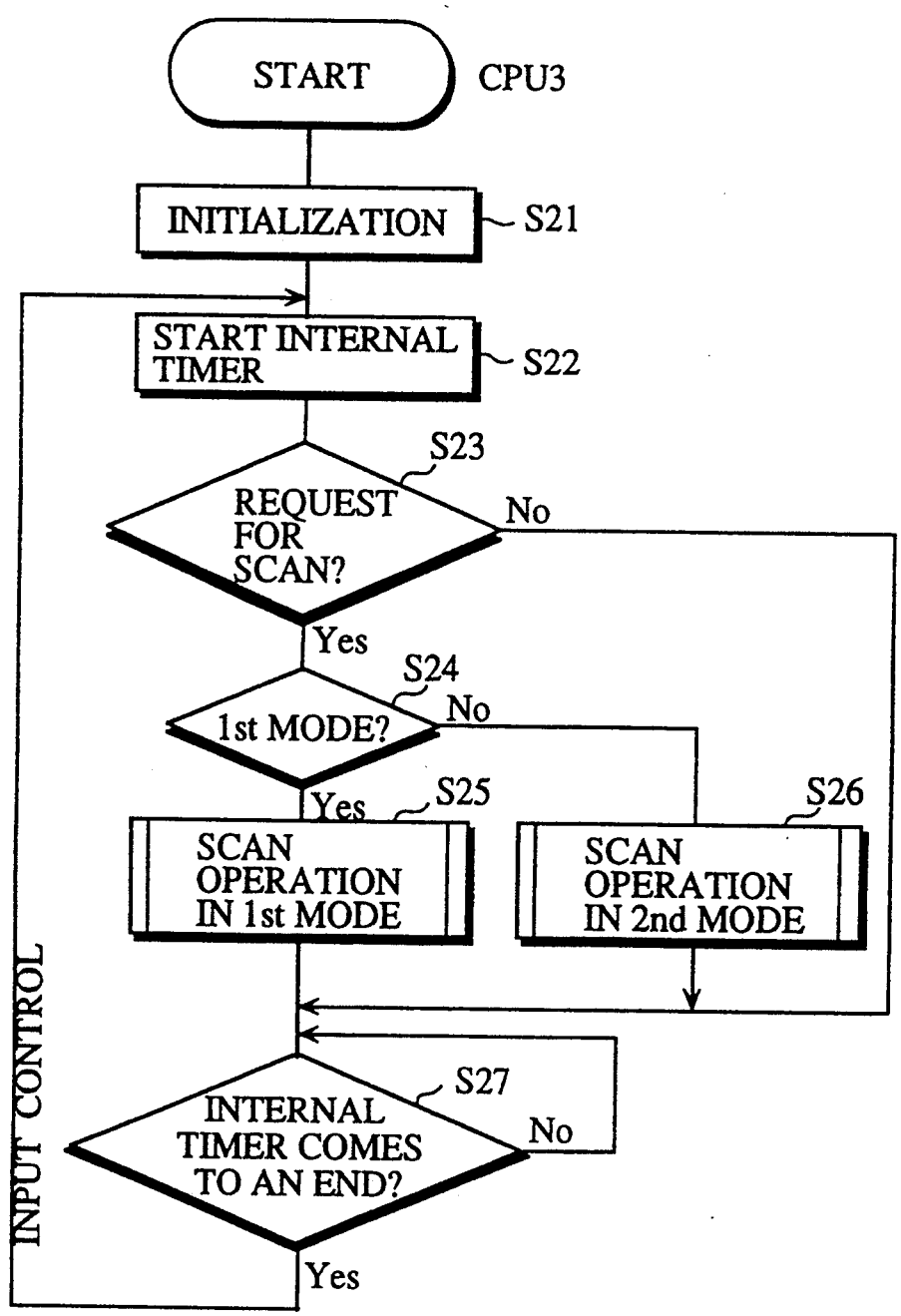
FIG. 16 is a flow chart showing the control process of the CPU 3 of FIG. 7.

FIG. 16 is a flow chart showing the control process of the CPU3. The CPU 3 first performs the initialization (S21) and then starts its internal timer so as to make sure that the routine is executed in a specified period of time (S22). Subsequently, if a request for scan from the CPU5 is confirmed (in the case of Yes in S23), the CPU3 further judges whether the mode being set is the first mode or not (S24). If the mode being set is the first mode (in the case of Yes in S24), the scanning operation is performed in the first mode (S25). In the case where the magnification of 0.707 is selected in the first mode, for example, reduction is performed by moving the lens so that the scanning operation is performed at the magnification.

On the contrary, if the mode being set is not the first mode (in the case of No in S24), the scanning operation is performed in the second mode (S26). In the case where the magnification of 1.414 is selected in the second mode, for example, enlargement is performed by further moving the lens so that the scanning operation is performed at the magnification. In the case of normal scanning where the second mode is not set, the processing remains in the first mode. If the end of the internal timer is confirmed (in the case of Yes in S27), the CPU3 returns to S22 and starts the internal timer again.

Figure 17:
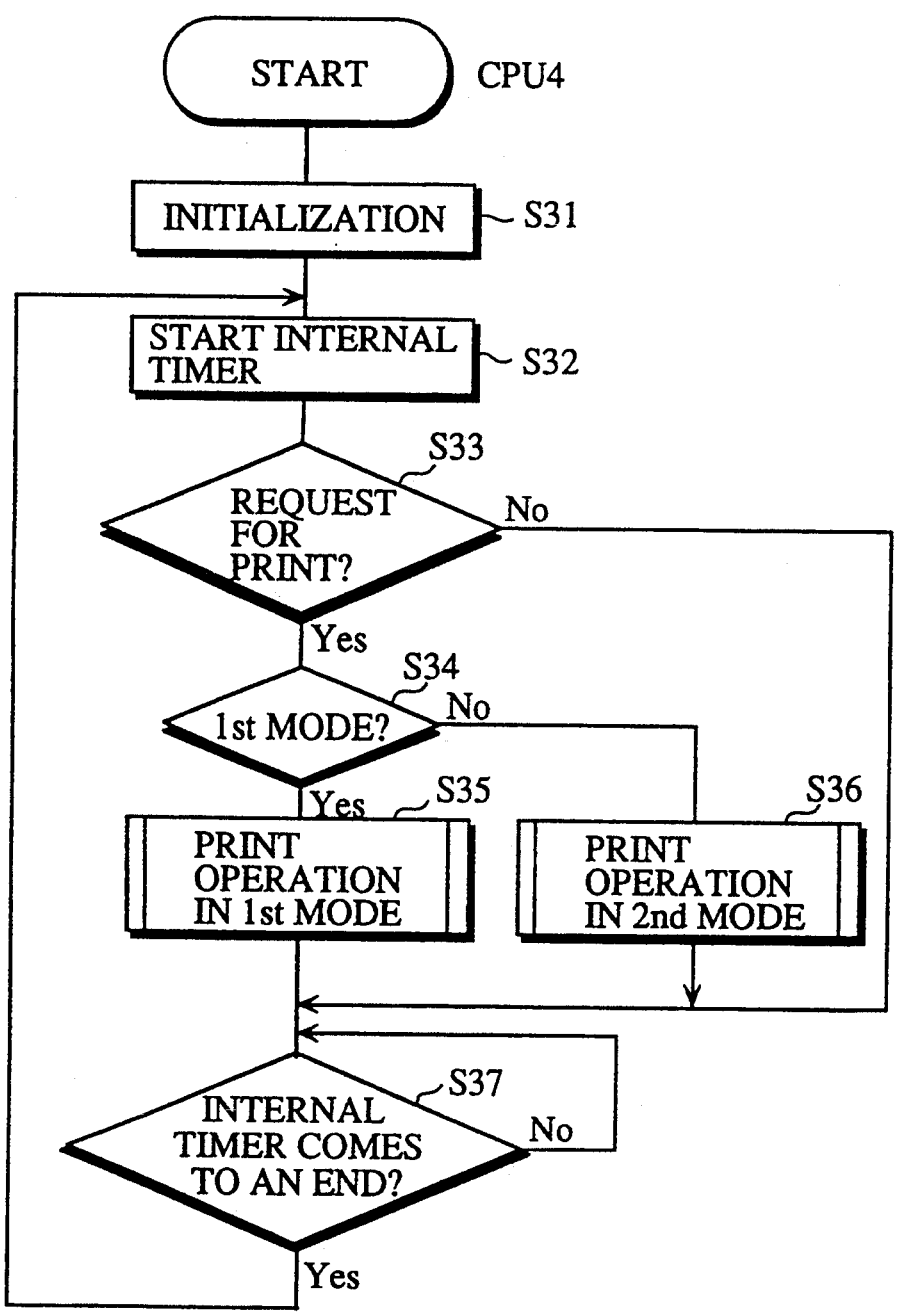
FIG. 17 is a flow chart showing the control process of a CPU4 of FIG. 7.

FIG. 17 is a flow chart showing the control process by the CPU4 of FIG. 7. The CPU4 first performs initialization (S31) and then starts the internal time so as to make sure that the routine is executed in a specified period of time (S32). Subsequently, if a request for print from the CPU5 is confirmed (in the case of Yes in S33), the CPU4 further judges whether the mode being set is the first mode or not (S34). If the mode being set is the first mode (in the case of Yes in S34), the printing operation is performed in the first mode (S35). In the case where the paper size is B5 and the double side copying mode is set, for example, the CPU4 selects the paper feeding cassette in which the B5-sized paper is contained, so as to perform double side copying.

On the contrary, if the mode being set is not the first mode (in the case of No in S34), the printing operation is performed in the second mode (S36). In the case where the paper size is A4, the single side copying mode is set, and the number of copies is 5 in the second mode, the CPU 4 selects the paper feeding cassette in which the A4-sized paper is contained, so as to produce five copies. If the end of the internal timer is confirmed (in the case of Yes in S37), the CPU4 returns to S32 and starts the internal timer again.

Figure 18:
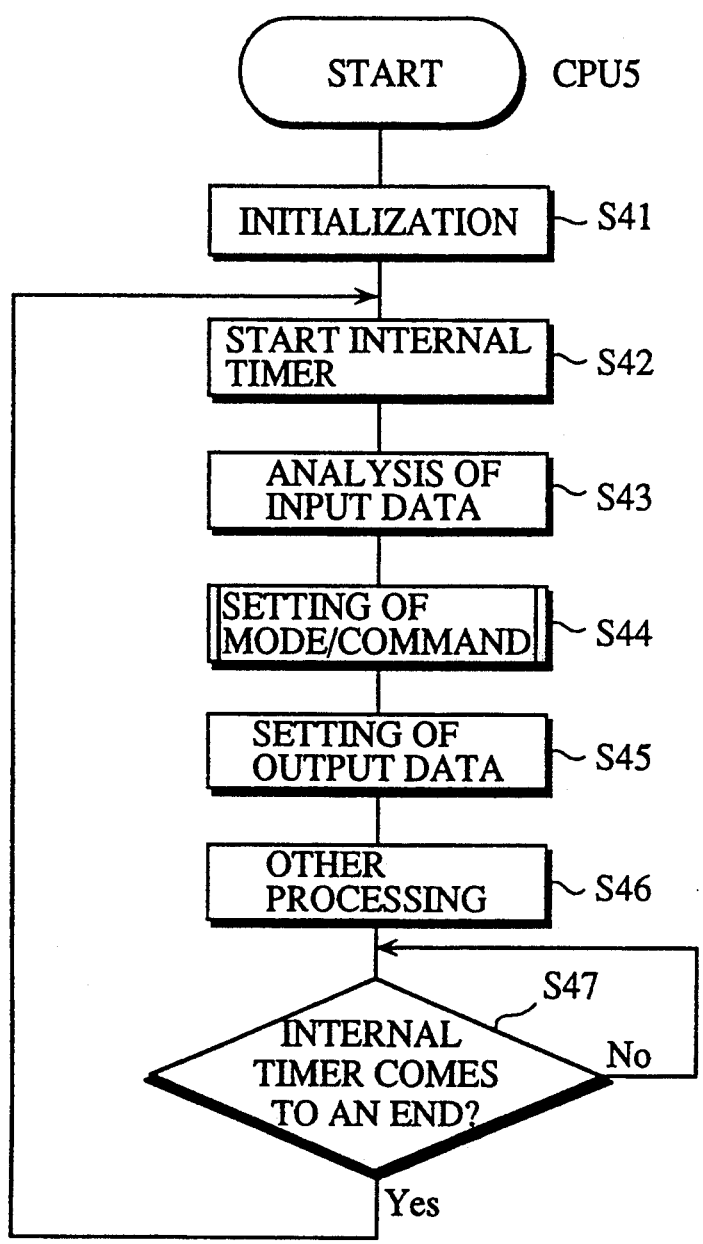
FIG. 18 is a flow chart showing a main routine executed in a CPU5 of FIG. 7.

FIG. 18 is a flow chart showing a main routine executed in the CPU5 of FIG. 7. The CPU5 is for controlling the overall operation of the printing apparatus 1 by providing activating and stopping commands to the other CPUs and by setting the operating modes of the other CPUs. The CPU5 first performs initialization (S41) and then starts its internal timer so as to make sure that the routine is executed in a specified period of time (S42). Subsequently, the CPU5 checks the data inputted by interrupt communication and analyzes the content thereof (S43). If there is another mode to be activated or if the magnification is changed in accordance with the content, the CPU5 further performs the mode/command process of newly setting the activating command or the mode data on magnification (S44). The CPU5 sets the data in the output area so as to output the data by communication (S45), performs other processing (S46), confirms the end of the internal timer (in the case of Yes in S47), and returns to S42 so as to start the internal timer again.

Figure 19:
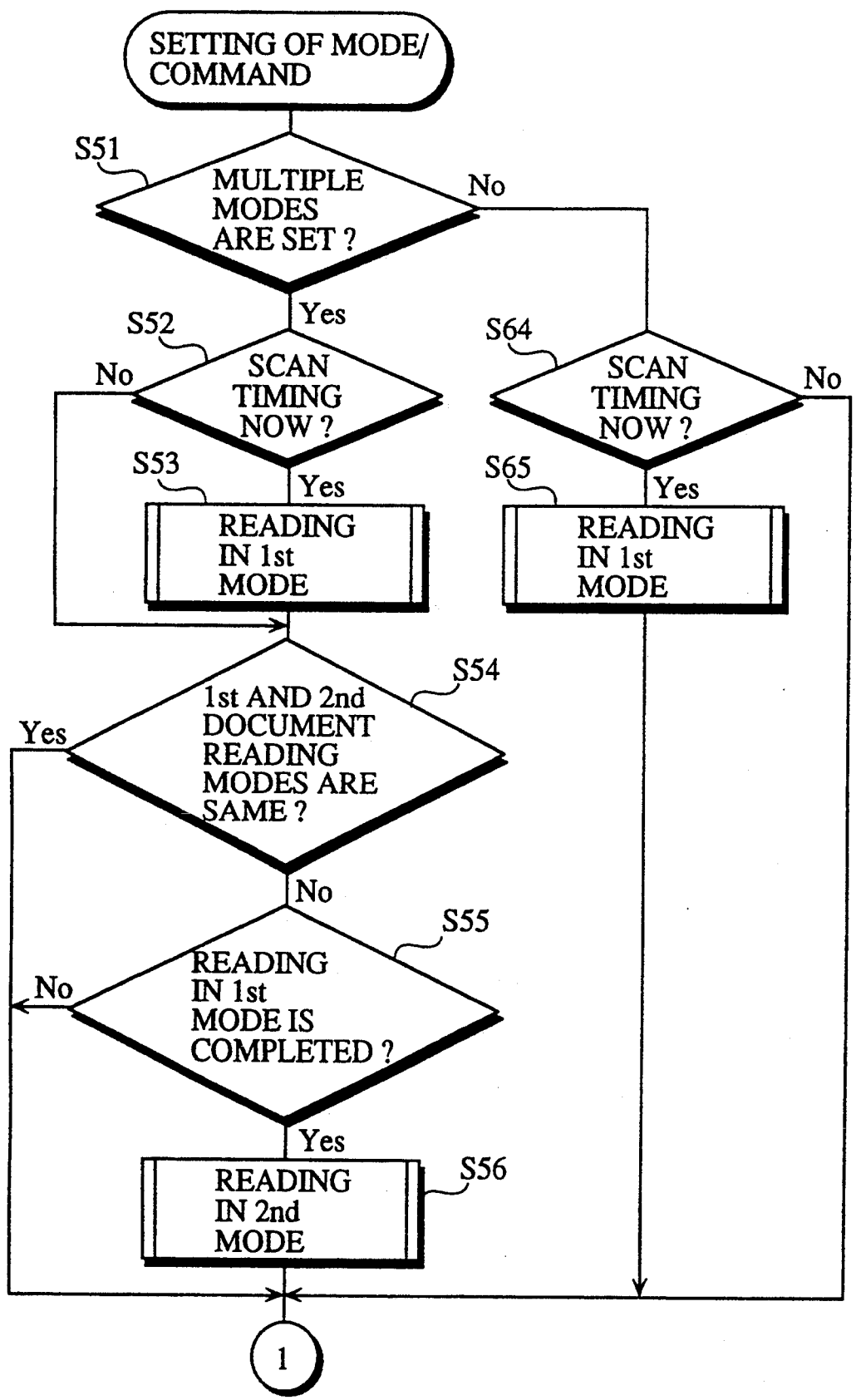
FIG. 19 is a flow chart showing a mode/command setting process (S44) of FIG. 18.
Figure 20:
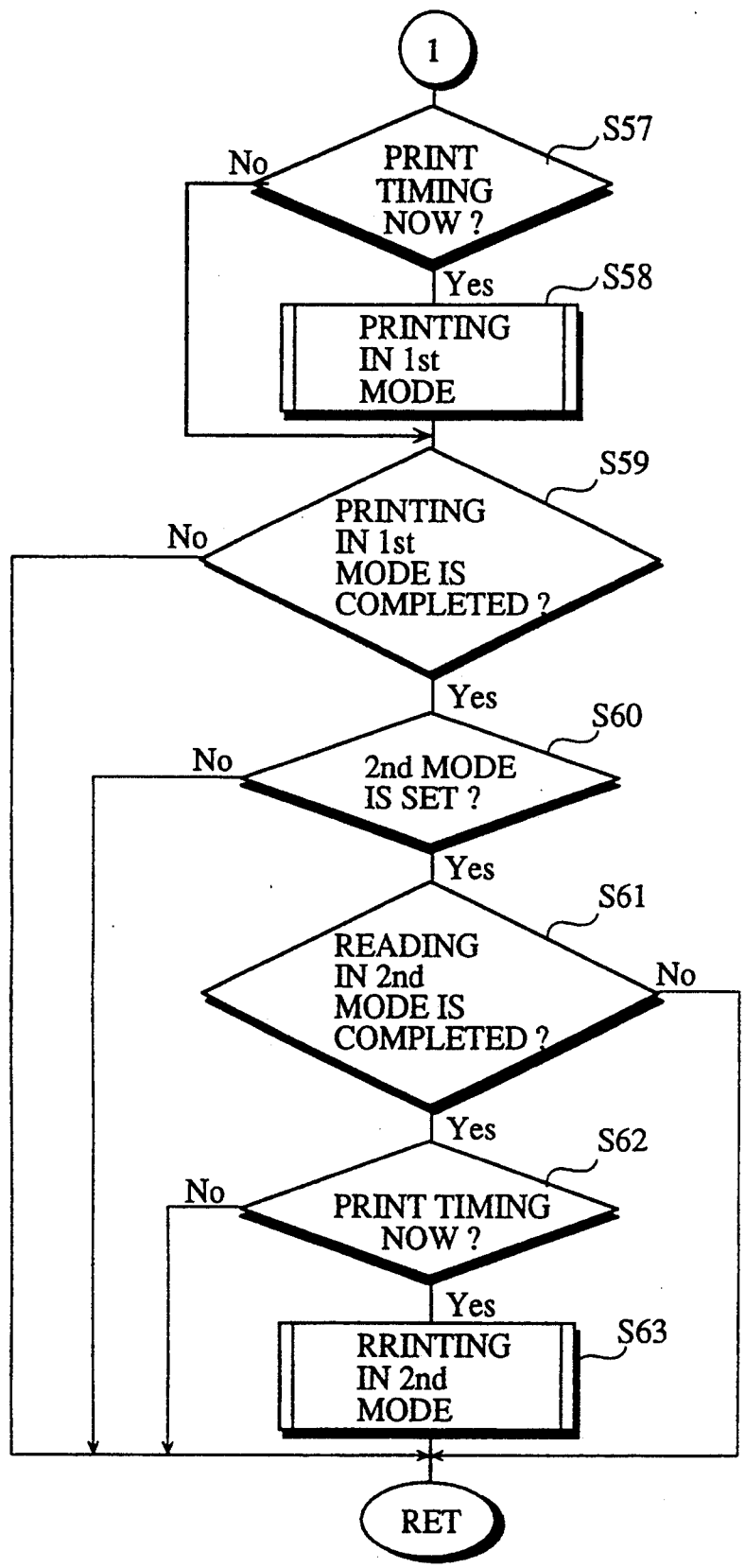
FIG. 20 is a continuation of the flow chart from FIG. 19.
Figure 21:
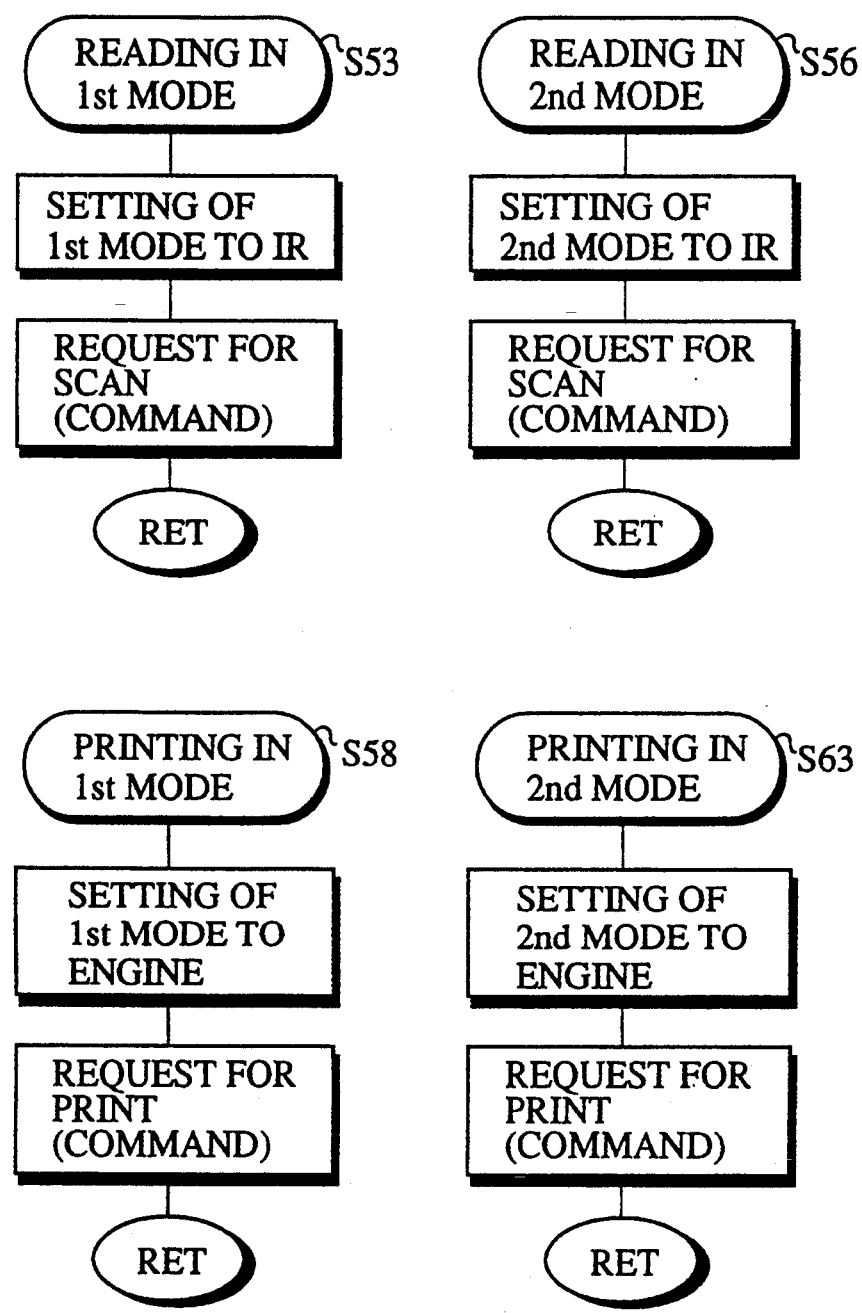
FIG. 21 is a flow chart showing a read process (S53 and S56) performed in the first and second modes of FIG. 19 and a print process (S58 and S63) performed in the first and second modes of FIG. 20.

FIG. 19 is a flow chart showing the mode/command setting process (S44) of FIG. 18. If the setting of a plurality of copying modes transmitted from the CPU1 is confirmed (in the case of Yes in S51), the CPU5 performs the reading operation which is expected to be performed when a plurality of modes are set (S52 to S56). If the setting of a single mode instead of a plurality of modes is confirmed (in the case of No in S51), the CPU5 confirms whether or not the scan timing is now so as to perform the normal scanning operation (S64). If the scan timing is now (in the case of Yes in S64), the read-in operation is performed in the first mode (S65).

The read-in operation in the case where a plurality of modes are set is performed by judging whether or not the scan timing is now when a specified period of time has passed after the start key 96 was turned on (S52). If the scan timing is judged now (in the case of Yes in S52), the CPU5 in S133), it further judges whether a plurality of modes are set or not (S134). If a plurality of modes are set (in the case of Yes in S134), the CPU8 drives the discharge bin switching motor M3 so as to change the destinations of printed paper in the next cycle of printing (S135). Consequently, the paper printed in the second mode is separated from the paper printed in the first mode. The CPU8 further conducts other processing (S136), and if it confirms the end of the internal timer (in the case of Yes in S137), the CPU8 returns to S132 and starts the internal timer again.

Referring now to the above drawings, the operation of the digital copier according to the present invention will be described below by presenting a specific example. In the case where the operator sets one copy of the same size in the first mode and 4 copies at the magnification of 0.707 in the 2in-1 mode (the other modes being set include automatic exposure and sorting mode) in the second mode, the CPU5 receives a plurality of modes from the CPU1, as shown in S43 of FIG. 18. In this case, since the two modes of the same size and 2in-1 are specified, scanning is performed twice and the operation of writing data in the memory is performed twice for each document on the basis of a memory write-in operation shown in S72 of FIG. 22. Consequently, the magnification data which is 1 in the first mode and which is 0.707 in the second mode, is written in the memory.

Figure 22:
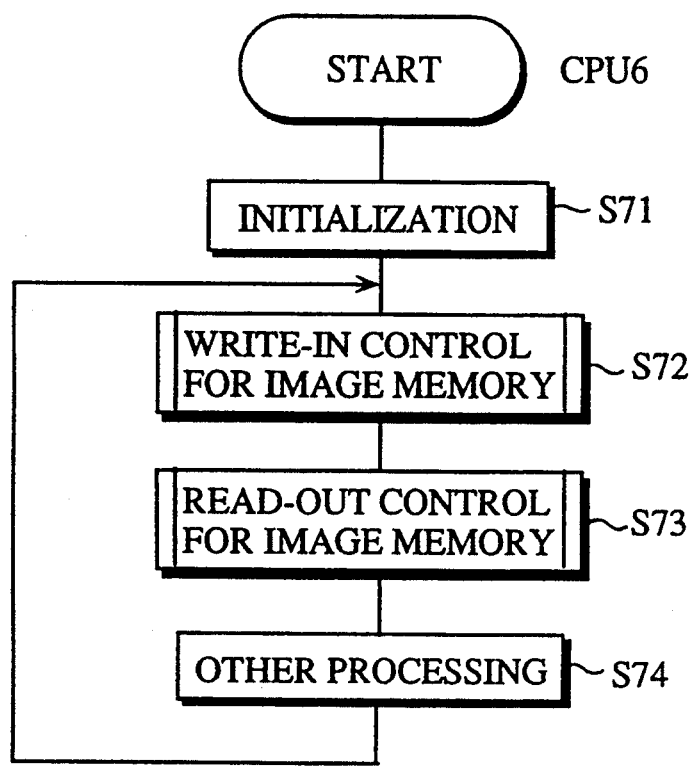
FIG. 22 is a flow chart showing a main routine executed in a CPU6 of FIG. 7.
Figure 23:
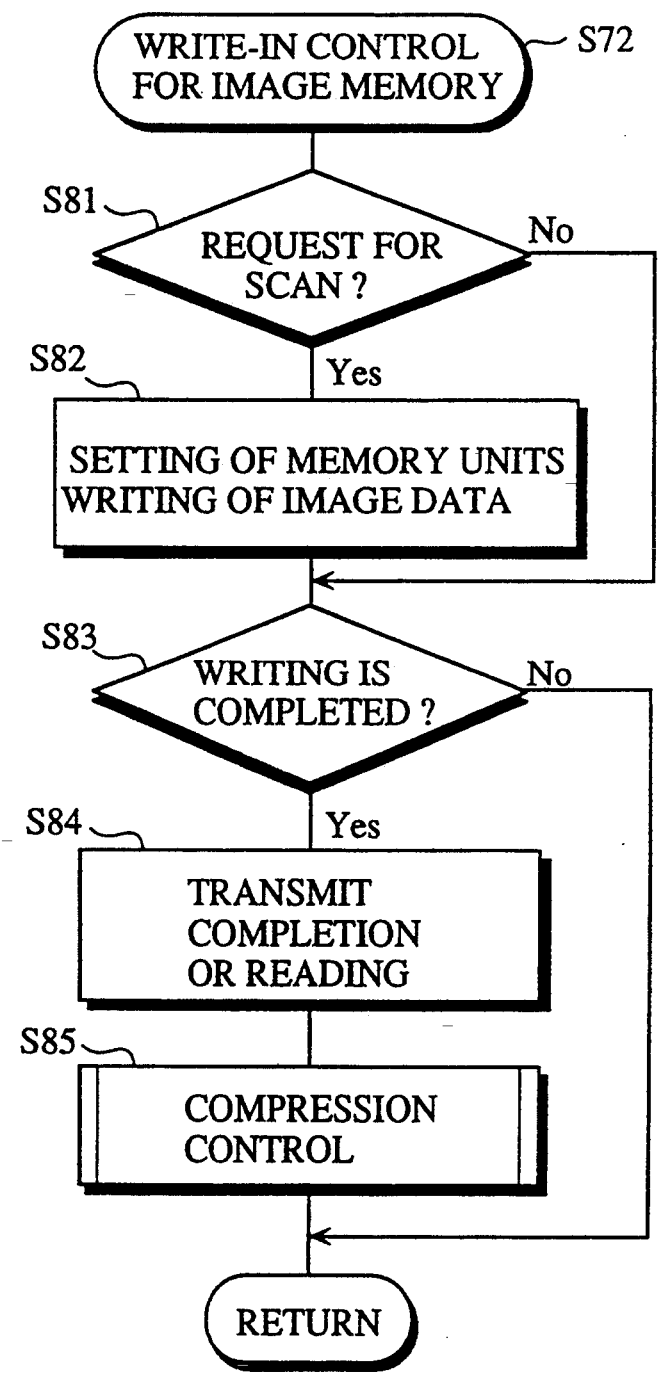
FIG. 23 is a flow chart showing the process of write-in control for the image memory (S72) of FIG. 22.
Figure 24:
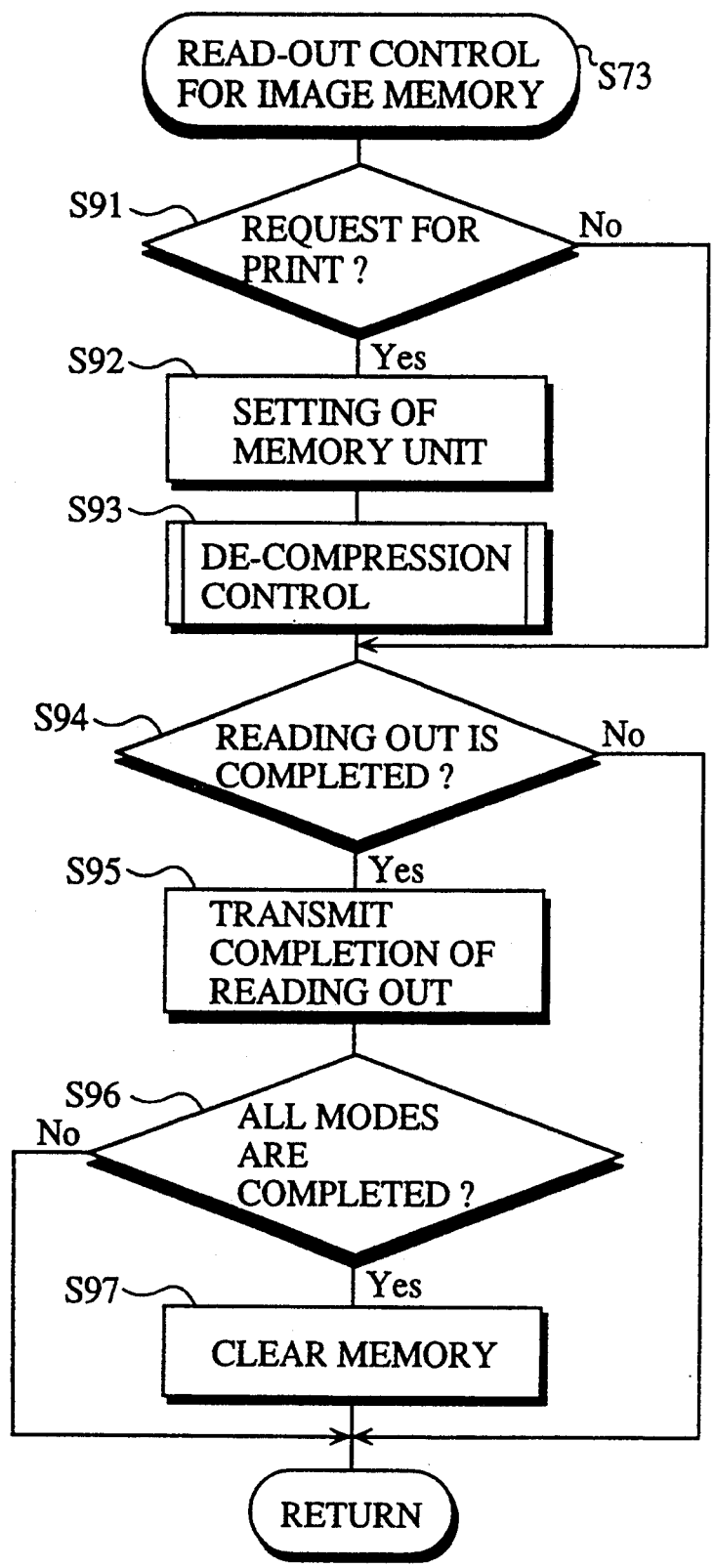
FIG. 24 is a flow chart showing the process or read-out control for the image memory (S73) of FIG. 22.
Figure 25:
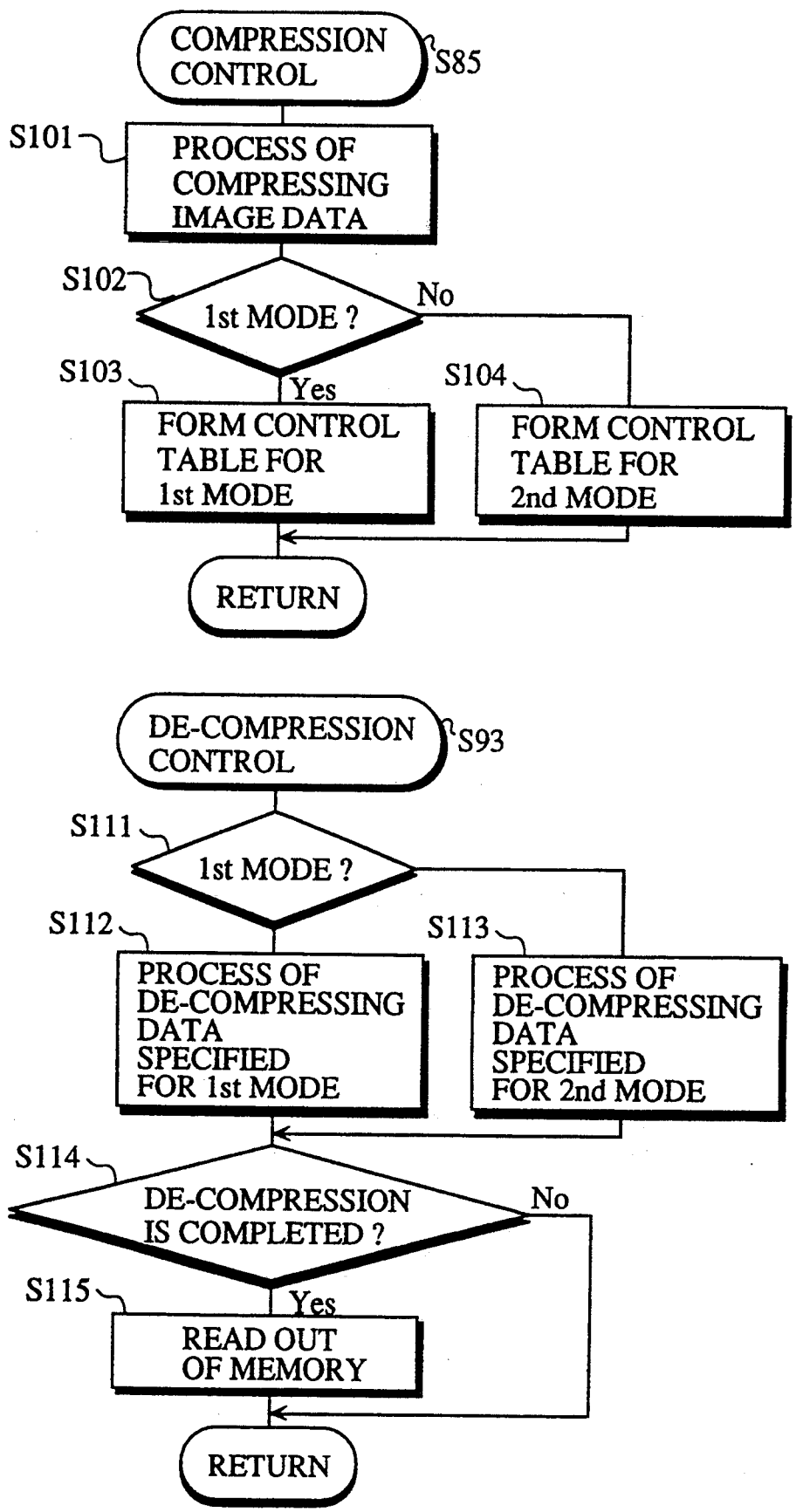
FIG. 25 is a flow chart showing the compression control process (S85) of FIG. 23 and the de-compression control process (S93) of the CPU7 of FIG. 24.
Figure 26:
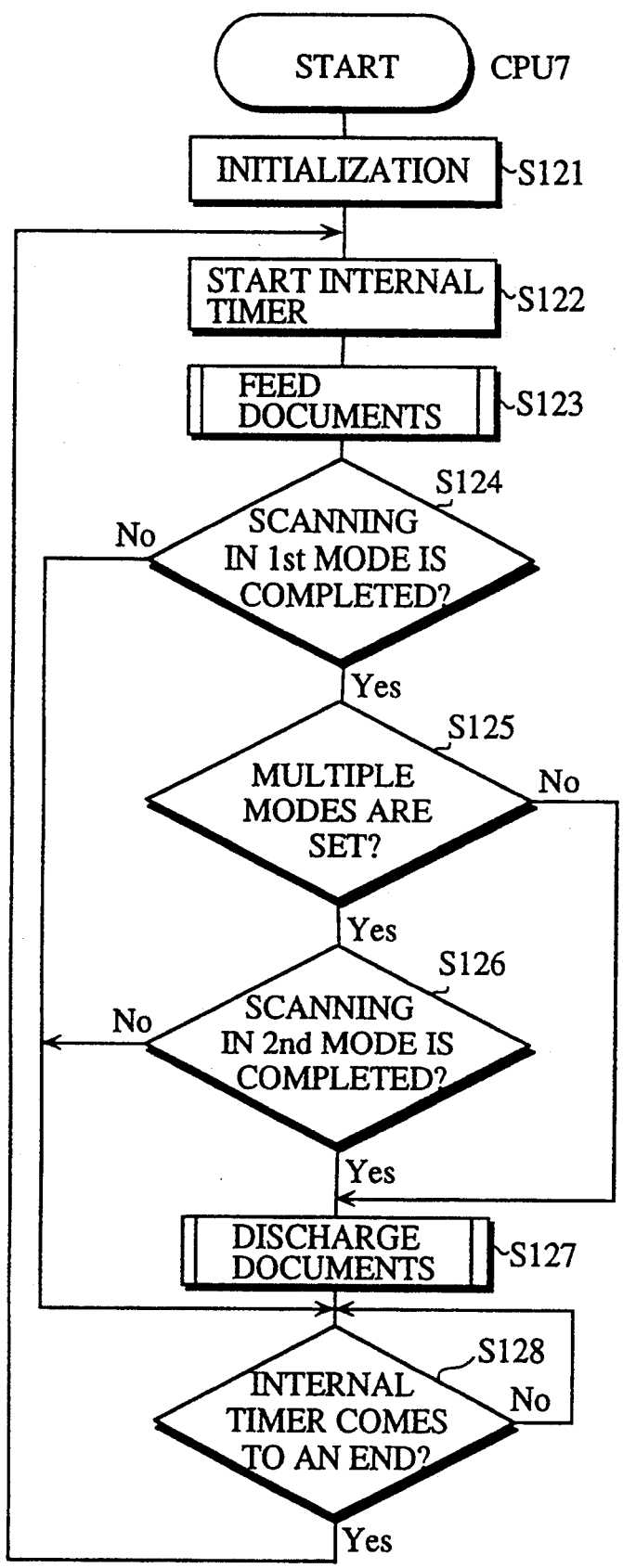
FIG. 26 is a flow chart showing the control process of the CPU7 of FIG. 8.
Figure 27:
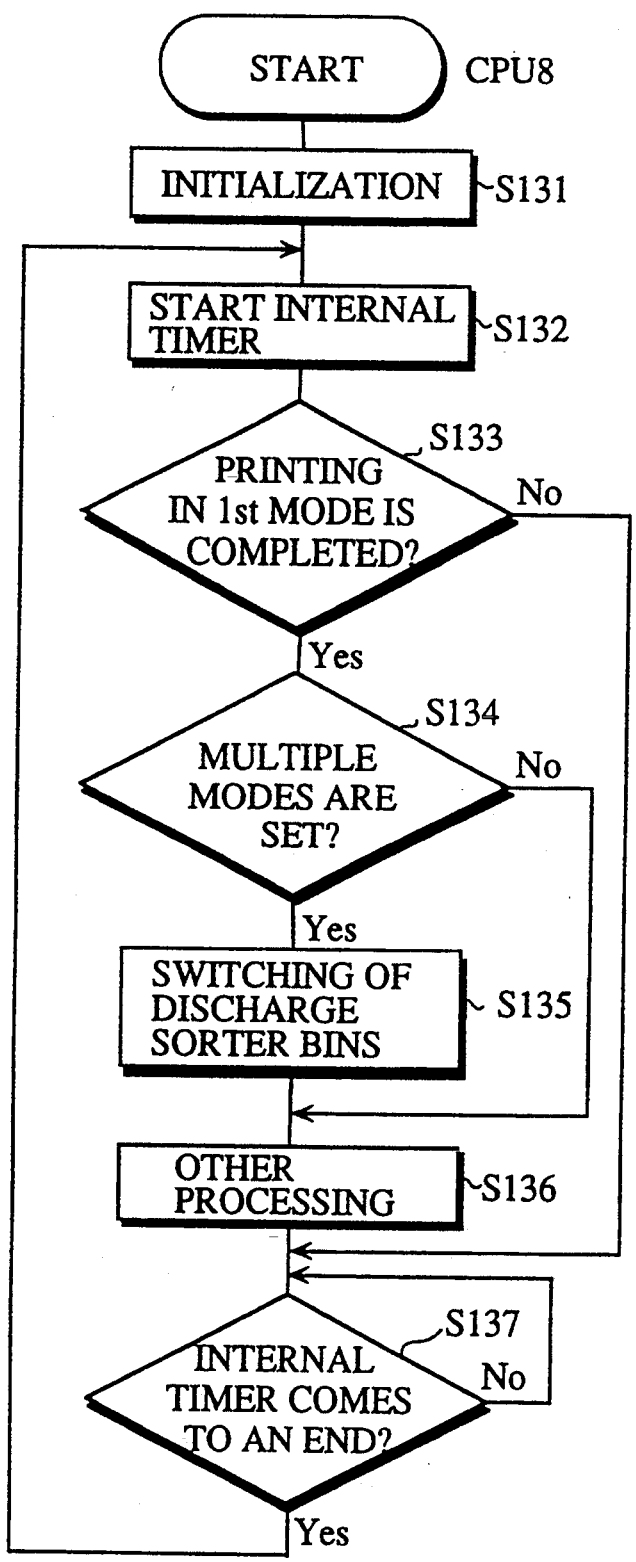
FIG. 27 is a flow chart showing the control process of the CPU8 of FIG. 8.

Every time the memory write-in operation in the same-size mode is completed, the CPU 5 directs the printer to print out on the basis of a memory read-out operation shown in S73 of FIG. 22. The printing in the same-size mode is performed for all the documents prior to the 2in-1 mode, for the 2in-1 mode is a sorting mode. Subsequently, the decompression process is performed twice on the basis of the image data read in at the magnification of 0.707 so as to produce the image data for one copy, thereby printing the required number of copies for each of the documents being set. In this case, decompression sequence is conducted twice.

As described above, the digital copier according to the present invention is characterized in that it enables a plurality of operating modes to be set before the copying operation are initiated and that the plurality of operating modes allow the sequential control of the IR, memory, and printer in this order.

There is another case in which, in differentiating the operating modes for the first copy and the second and subsequent copies, copying proceeds in the non-sort mode irrespective of the presence and absence of the sorter being mounted. A conventional procedure practiced in such a case is as follows. Initially, a specified number of copies are outputted for one document. Then, the document is replaced by another document so that a specified number of copies are also outputted for the new document. These procedures are repeated until the copying of all the documents is completed. There is still another case where a plurality of copies are to be produced in the sorting mode with the sorter being mounted. According to the conventional procedure practiced in such a case, the output bins are changed every time one copy is outputted for one document. The copying operation is repeatedly performed while changing the output bins for each copy until the copying of all the documents is completed.

By contrast to these conventional procedures, the digital copier according to the present invention with the sorter mounted therein will operate, in the non-sort mode or in the sort mode, as follows. In the non-sort mode, a conventional copying apparatus normally outputs all the copies onto the uppermost discharge tray. However, the digital copier of the present invention sequentially performs the following operations:

(1) To the CPU4, the CPU5 sends a command to output a copy onto the non-sort bin (paper discharge bin).
(2) Output is directed to the printer based on the image data read in the same-size mode.
(3) The operation of (2) is repeated for each document. Consequently, one copy of the same size is outputted onto the non-sort bin for each document.
(4) To the CPU4, the CPU5 sends a command to output a copy onto the sort bin 1 (see S135 OF FIG. 27).
(5) The remaining number of copies are outputted in the 2in-1 mode.
(6) During the sequence, the compression process is performed twice so as to expand the image data for two pages (the image data read at the magnification of 0.707) in the image memory for one page.
(7) Output is directed to the printer in the print sequence.
(8) The operation of (7) is repeated for the remaining number of copies.
(9) If there is a remaining document image, the process is repeated from the operation (6). If not, the process is completed.

Thus, the second and subsequent copies in the non-sort mode are outputted onto the sort bin 1. Since the sort bins are changed in every mode when a plurality of modes are set, convenience for the operator after the copying is completed is significantly improved. If the sorter is not mounted, the operation of switching the sort bins cannot be performed. However, it is also possible to carry out a similar operation in accordance with an electronic sorting method in which a rotating operation is performed in the memory.

In the sorting mode, the digital copier of the present invention will perform the following operations:

(1) To the CPU4, the CPU5 sends a command to output a copy onto the sort bin 1.
(2) Output is directed to the printer based on the image data read in the same-size mode.
(3) The operation of (2) is repeated for each document. Consequently, one copy of the same size is outputted onto the sort bin 1 for each document.

(4) The remaining number of copies are outputted in the 2in-1 mode.
(5) A copy-out command onto the sort bin 2 is transmitted to the sort bin 2 on outputting the first copy.
(6) The compression process is performed twice so as to expand the image data for two pages (the image data read at the magnification of 0.707) in the image memory for one page.
(7) Output is directed to the printer in the print sequence.
(8) If all the copies are not outputted, the switching to the next sort bin is performed.
(9) The operation of (6) is repeated.
(10) If there is a remaining document image, the process is repeated from the operation (5). If not, the process is completed.

Thus, in the sorting mode, the first copy is outputted first and then the second and subsequent copies are sorted. Also in the memory sorting mode which does not use the sorter, the first copy is outputted first and then the second and subsequent copies are sorted. Consequently, the first copy is always outputted first with or without the sorter, so that the procedures after the copying out will be carried out easily.

Although the same-size mode is set as the first mode and the 2in-1 mode is set as the second mode, by way of example, it is possible for the operator to set the same-size copying in the first mode and the double-side copying in the second mode or to set the use of normal paper in the first mode and the use of OHP in the second mode, for example. In the digital copier according to the present invention, the copying mode for the first copy and the second and subsequent copies can be differentiated, for example. The combination of the copying modes is not limited to that of the same-size and 2in-1 modes, and other combinations of the copying modes can flexibly be adopted in the digital copier of the present invention. The copying mode can also be changed for every single copy or every plurality of copies. In this case, it is possible to control the timing of changing modes by simply designating the content and operation order of modes and by detecting the document-sorting paper which accompanies the documents. Even in the case where the magnification for copying is varied depending on the number of copies, a single read operation will be sufficient if the image data stored in the memory is electrically enlarged or reduced. Accordingly, the operator can set various modes for one document, so that the convenience for the operator to use the digital copier of the present invention can significantly be improved.

Figure 28:
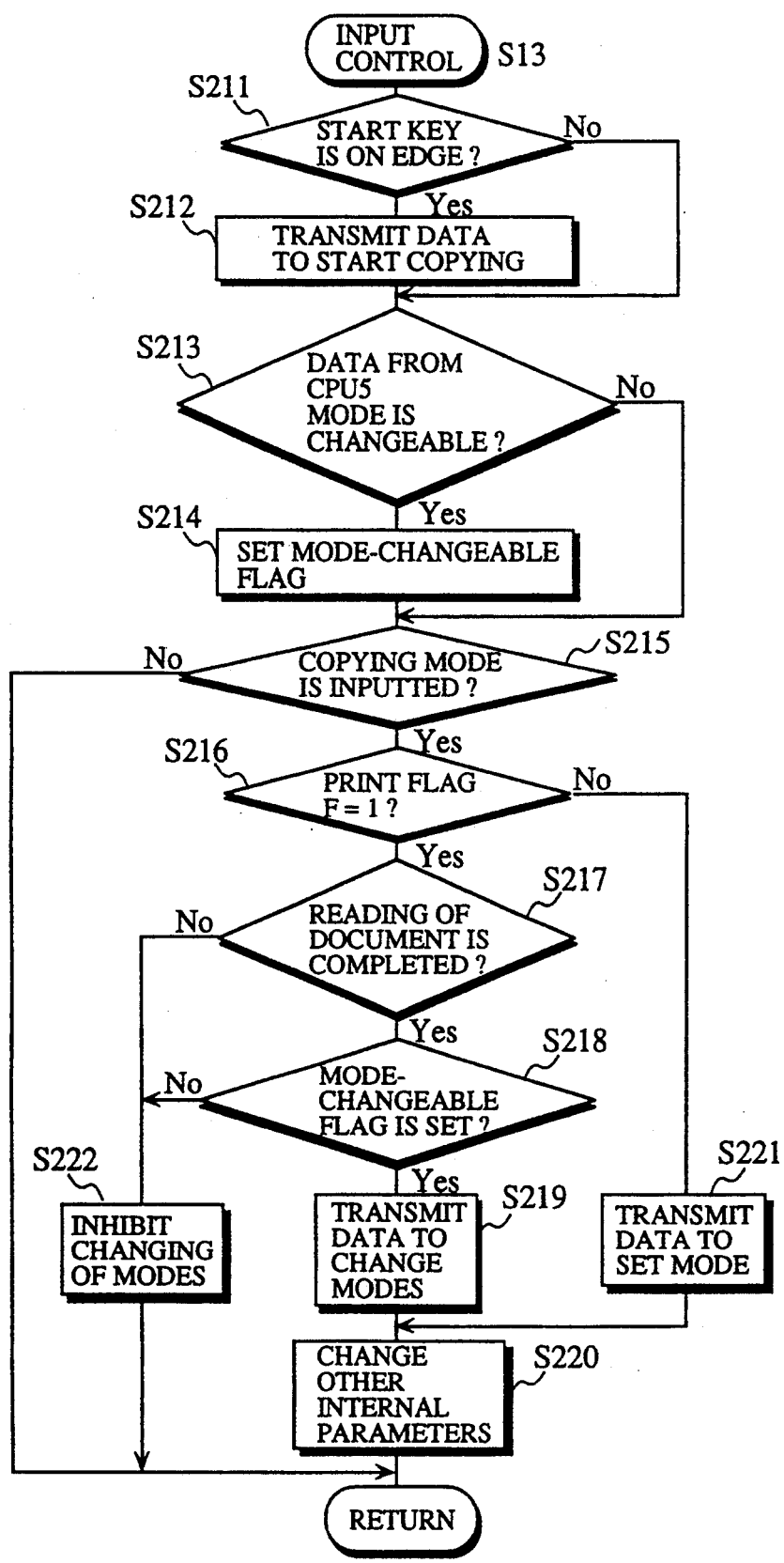
FIG. 28 is a flow chart showing a second embodiment of the input control process (S13) of FIG. 12.

Below, the control for changing the copying conditions being set during the copying operations will be described with reference to FIGS. 28 to 38. FIG. 28 is a flow chart showing the input control process (S13) of FIG. 12. If the start key 96 is judged to be ON EDGE (in the case of Yes in S211), the data to start copying is transmitted to the CPU5 so that the copying operation is initiated (S212). Subsequently, when the operating mode is determined (specifically, when the document size is detected), the CPU5 sends data to the CPU1 in order to show whether the mode in operation is changeable or not (S213). If the mode is changeable (in the case of Yes in S213), a mode-changeable flag is set (S214).

If a copying mode is inputted at the time (in the case of Yes in S215), it is confirmed whether a print flag F is 1 or not (S216). If the print flag F is 0, which indicates the wait state for copying (in the case of No in S216), data on the copying mode being set is transmitted to the CPU5 (S221). On the contrary, if the print flag F is 1, which means the copying operation is ongoing (in the case of Yes in S216), it is further confirmed whether the reading of the first document was completed or not (S217). If the reading is completed (in the case of Yes in S217), it is further confirmed whether the mode is changeable or not, i.e., whether the mode-changeable flag is set or not (S218). If the mode-changeable flag is set, which indicates a changeable mode (in the case of Yes in S218), the data to change copying modes is transmitted to the CPU5 (S219). If the data to change copying modes is transmitted, the CPU5 stores it in the RAM 129 for the copying mode. Subsequently, other internal parameters are changed (S220) and the process returns to the beginning of the flow chart. However, if the reading of the first document is not completed (in the case of No in S217) or if the mode-changeable flag is not set, the operation of inhibiting the changing of modes is performed (S222).

Figure 29:
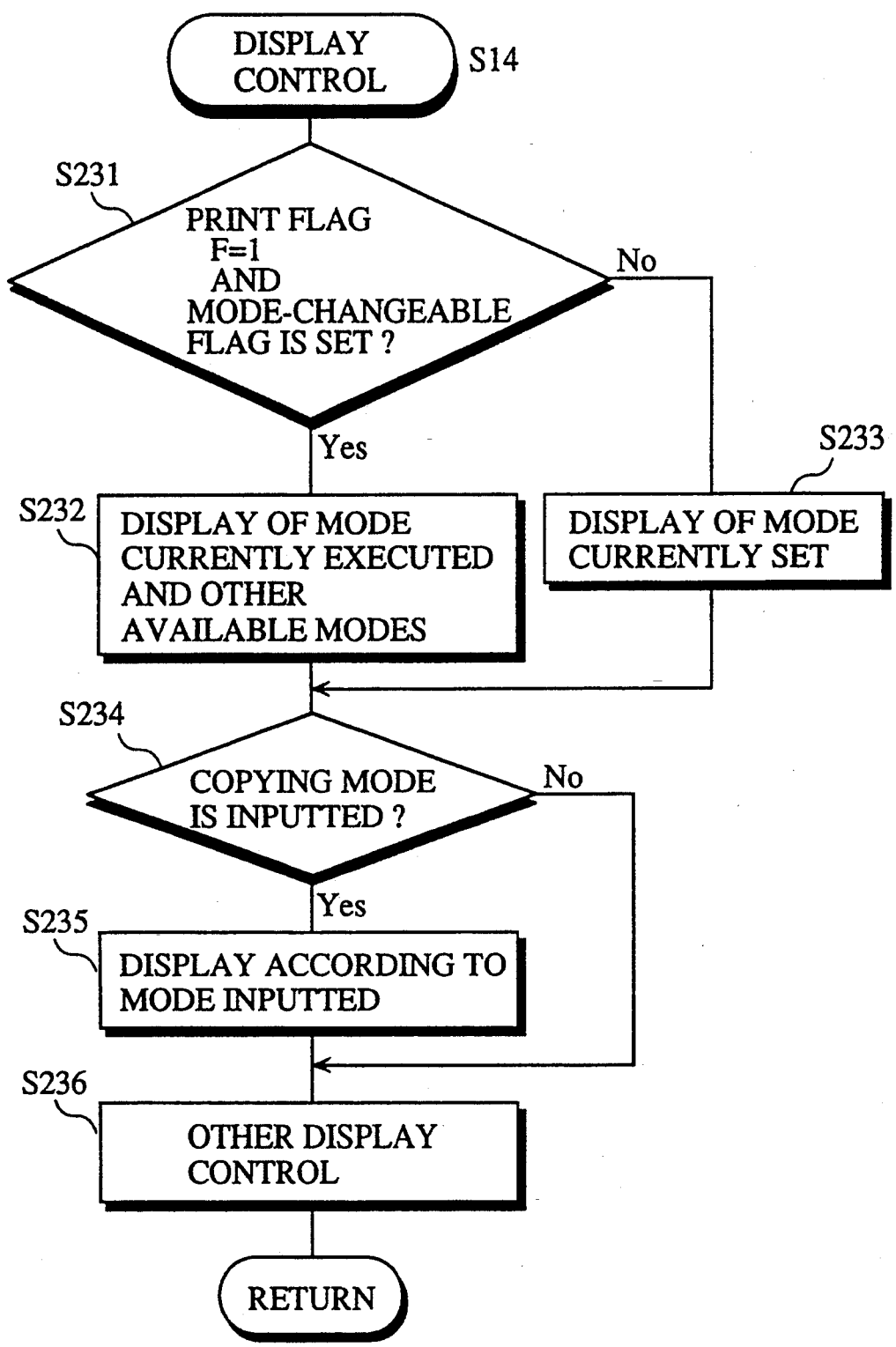
FIG. 29 is a flow chart showing the display control process (S14) of FIG. 12.

FIG. 29 is a flow chart showing the display control process (S14) of FIG. 12. If it is confirmed that the print flag F is 1, which indicates the copying operation is ongoing, and that the mode-changeable flag is set (in the case of Yes in S231), the mode currently executed and other available modes are displayed (S232). In the case of the wait state for copying (in the case of No in S231), on the contrary, the mode currently set is displayed (S233). If a copying mode is inputted at the time (in the case of Yes in S234), the display control is conducted in accordance with the mode inputted (S235). After conducting other display control (S236), the process returns to the beginning of the flow chart.

Figure 30:
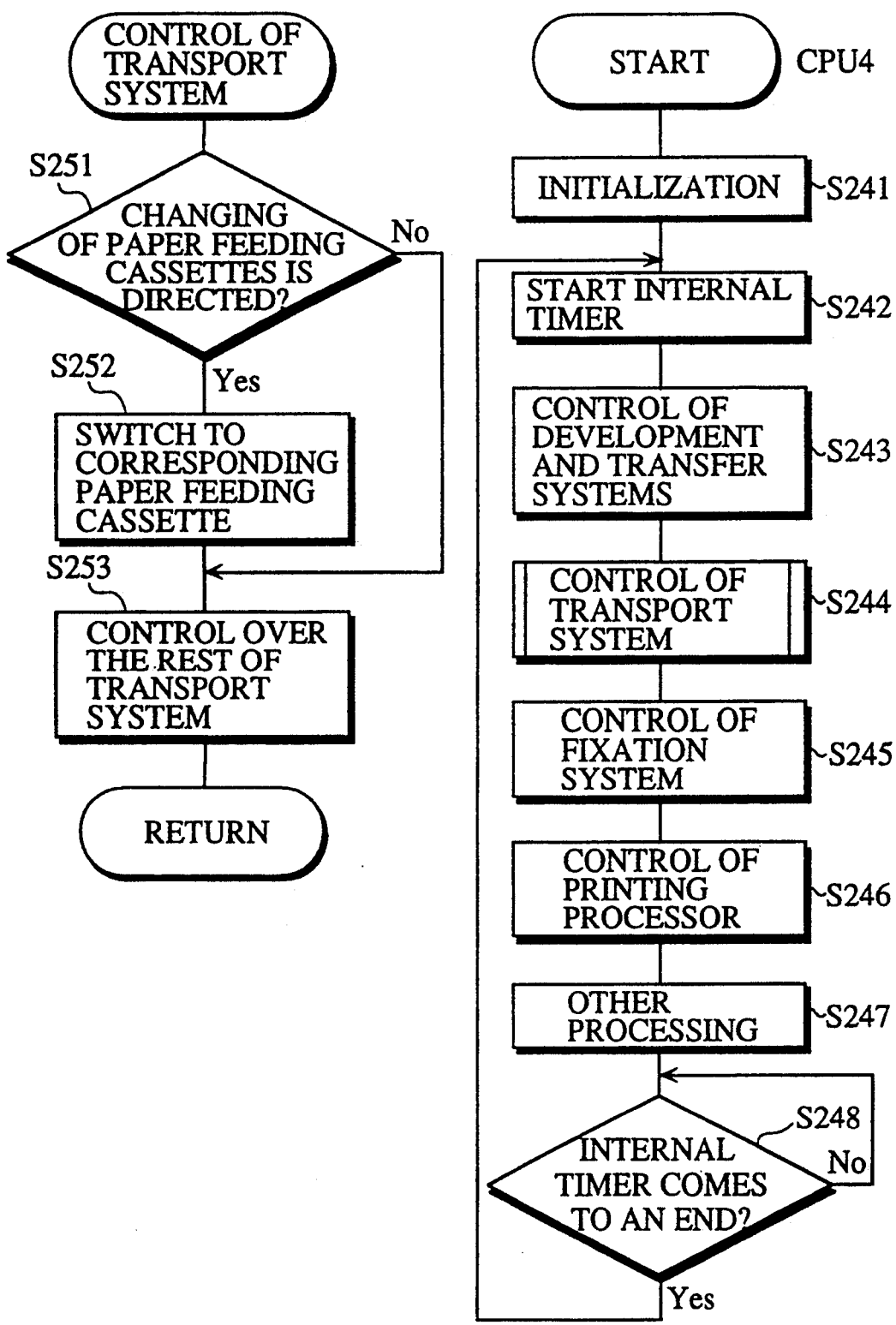
FIG. 30 is a flow chart showing a second embodiment of the main routine executed in the CPU4 of FIG. 7 and the control of a transport system conducted therein.

FIG. 30 is a flow chart showing a main routine executed in CPU4 of FIG. 7 and the control of the transport system conducted therein. The CPU4 first performs initialization (S241) and then starts its internal timer so as to make sure that the routine is executed in a specified period of time (S242). Subsequently, the CPU4 performs the controlling operations over the development transfer system 70A of FIG. 1 (S243), transport system 70B (S244), fixation system 70C (S245), and print processor 40 (S246), and then carries out other processing (S247). If the end of the internal timer is confirmed (in the case of Yes in S248), the CPU4 returns to S242 and starts the internal timer again.

As for the control over the transport system 70B, the CPU 4 confirms whether or not there is a command to change paper feed cassettes (S251). If there is (in the case of Yes in S251), the current paper feed cassette is changed to the corresponding one (S252). The CPU4 further performs controlling operations over the rest of the transport system (S253) and returns to the beginning of the flow chart.

Figure 31:
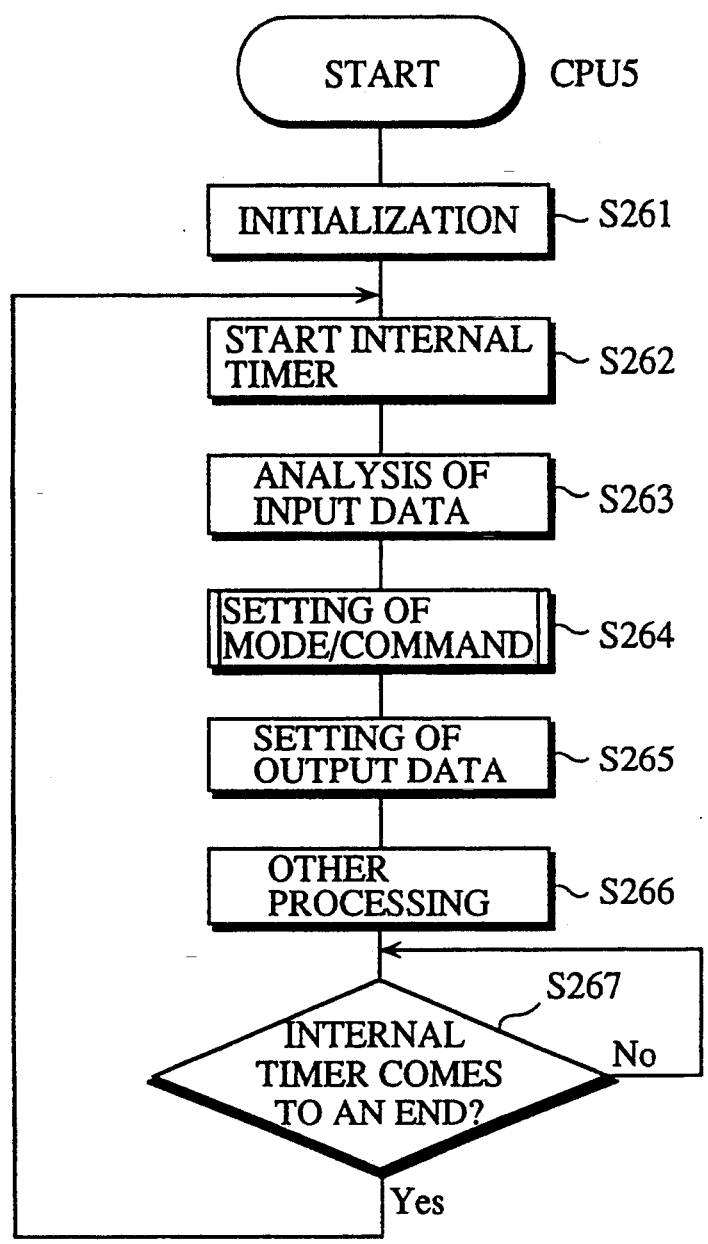
FIG. 31 is a flow chart showing a second embodiment of the main routine executed in the CPU5 of FIG. 7.

FIG. 31 is a flow chart showing a main routine executed in the CPU5 of FIG. 7. The CPU5 is for controlling the overall operation of the printing apparatus 1 by providing activating and stopping commands to the other CPUs and by setting the operating modes of the other CPUs. The CPU5 first performs initialization (S261) and then starts its internal timer so as to make sure that the routine is executed in a specified period of time (S262). Subsequently, the CPU5 checks the data inputted by interrupt communication and analyzes the content thereof (S263). If there is another mode to be activated or if the magnification is changed in accordance with the content, the CPU5 further performs the mode/command process of newly setting the activating command or the mode data on magnification (S264). The CPU5 sets the data in the output area so as to output the data by communication (S265), performs other processing (S266), confirms the end of the internal timer 5 (in the case of Yes in S267), and returns to S262 so as to start the internal timer again.

Figure 32:
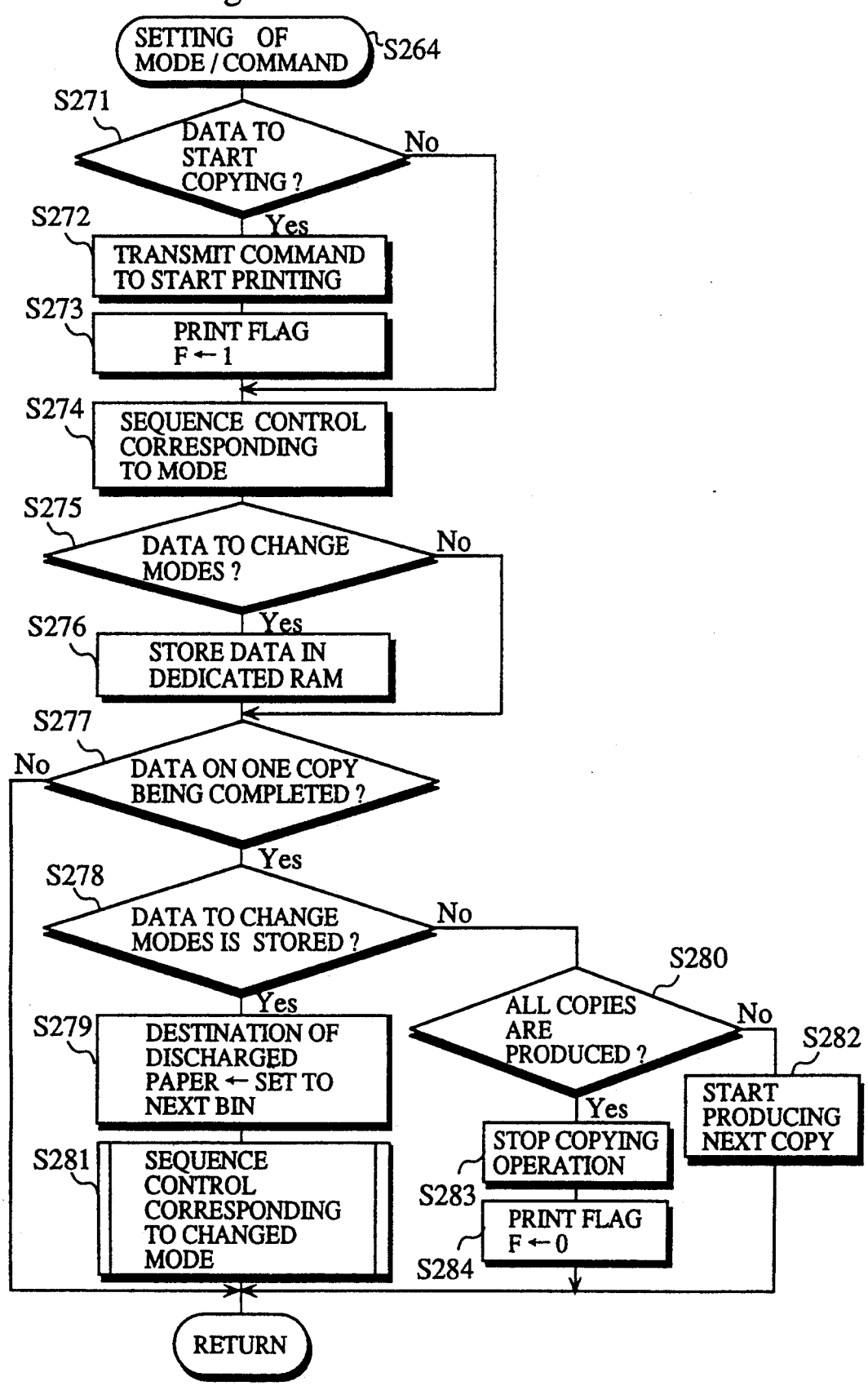
FIG. 32 is a flow chart showing the mode/command setting process (S264) of FIG. 31.

FIG. 32 is a flow chart showing the mode/command setting process (S264) of FIG. 31. If it is judged from the analysis of the transmitted input data that the transmitted data is the data to start copying (in the case of Yes in S271), a command to start printing is sent back to each of the CPUs (S272) and the print flag F for indicating that the copying operation is ongoing is set to 1 (S273). Sequence control corresponding to the mode being set is conducted so as to execute copying (S274). In the case of the wait state for copying, the process is passed through.

Next, it is judged whether the transmitted data is the data to change modes or not (S275). If it is the data to change modes (in the case of Yes in S275), the transmitted data is stored in the dedicated RAM (S276). Subsequently, it is judged whether the transmitted data is the data on one copy being completed or not (S277). If it is the data on one copy being completed (in the case of Yes in S277), the dedicated RAM is further checked for whether the data to change modes is stored therein or not (S278). If the data to change modes is not stored (in the case of No in S278), it is further confirmed whether all the numbers of copies are produced or not (S280). When they are produced (in the case of Yes in S280), each of the CPUs is directed to stop the copying operation (S283) and the print flag F is reset to 0 (S284). On the contrary, if all the numbers of copies are not completed yet with some copies remaining to be produced (in the case of No in S280), the production of the next copy is started (S282).

However, if the data to change modes is stored in the dedicated RAM (in the case of Yes in S278), the CPU8 is directed to change the destination of discharged paper to the next bin irrespective of sorting modes (S279). Subsequently, sequence control corresponding to the changed mode is conducted so as to perform the copying operation (S281).

Figure 33:
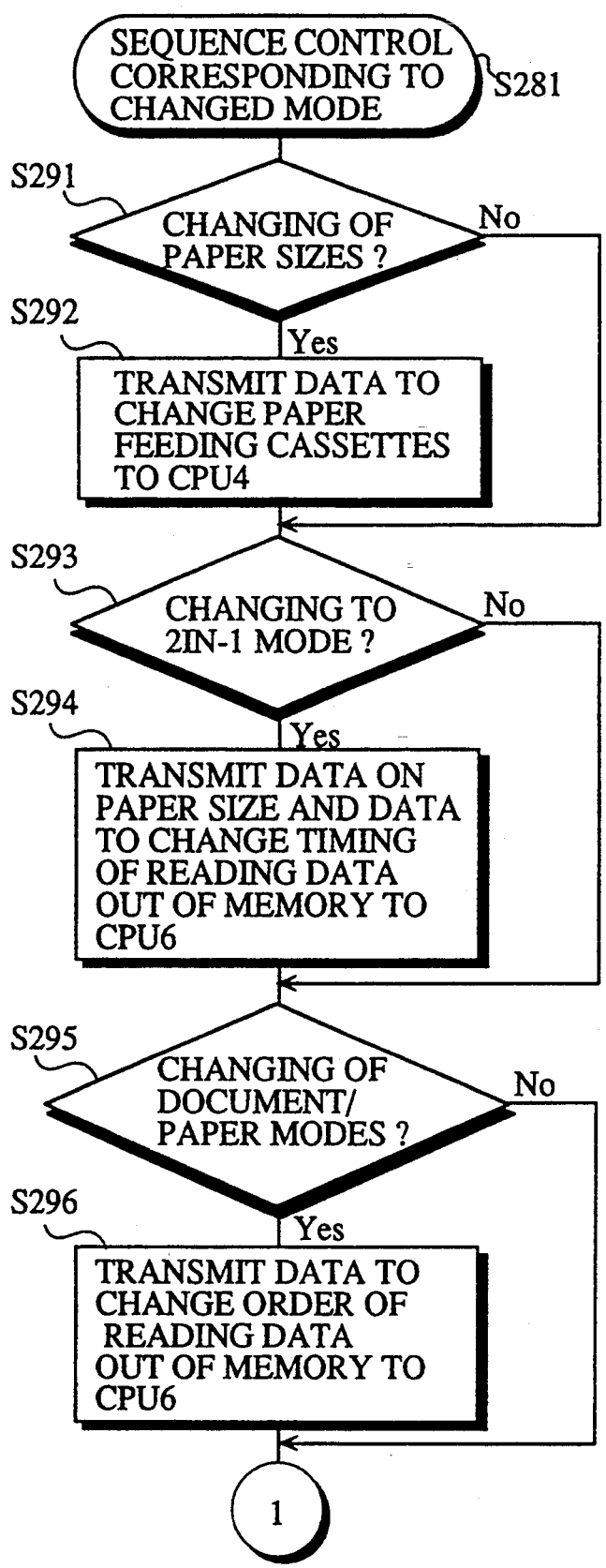
FIG. 33 is a flow chart showing the sequence control process (S281) corresponding to the changed mode of FIG. 32.
Figure 34:
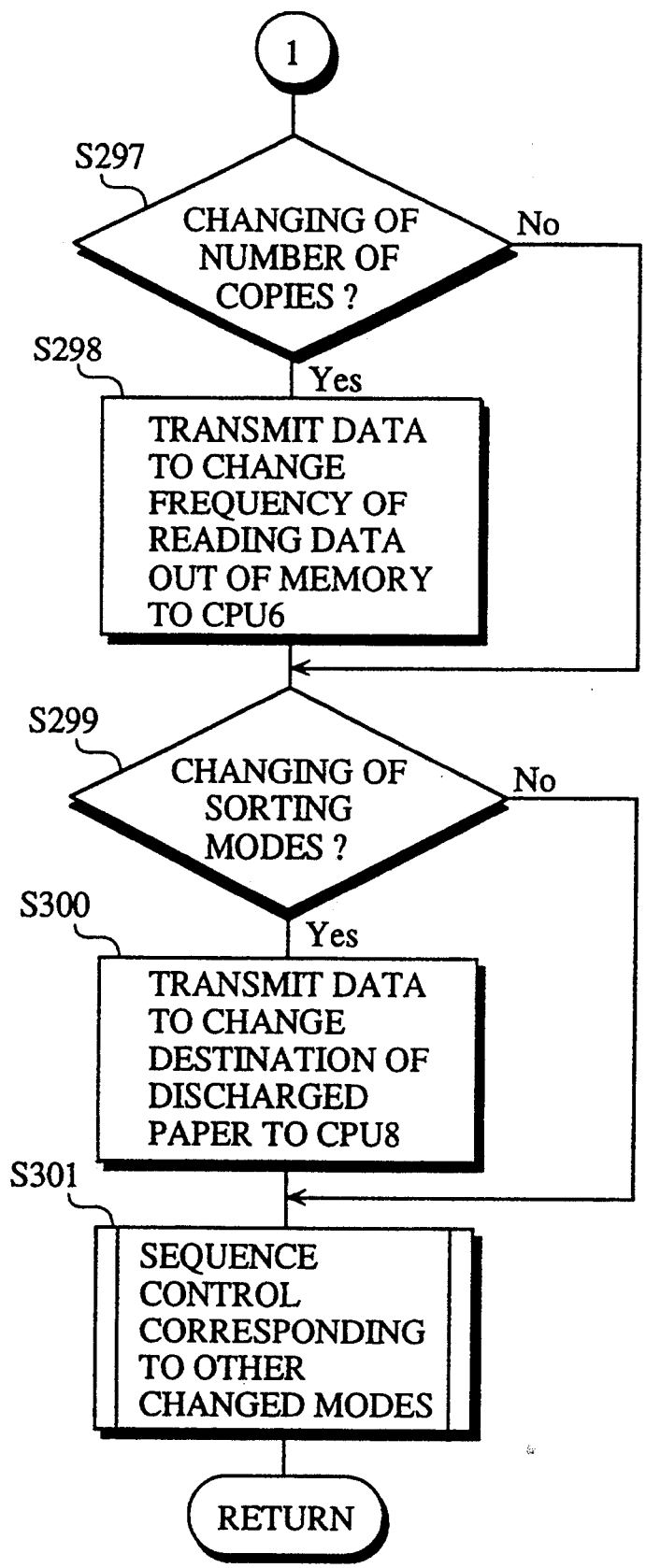
FIG. 34 is a continuation of the flow chart from FIG. 33.

FIG. 33 is a flow chart showing the sequence control (S281) corresponding to the changed mode of FIG. 32. If the paper to be fed is to be changed (in the case of Yes in S291), data to change paper feed cassettes is transmitted to the CPU4 so that the CPU4 operates in accordance with the changed mode (S292). If the changed mode is the 2in-1 mode (in the case of Yes in S293), data on paper size and data to change timing of reading data out of the memory are transmitted to the CPU6 so that the CPU6 operates in accordance with the changed mode (S294). If the document/paper mode is to be changed (in the case of Yes in S295), data to change the order of reading data out of the memory is transmitted to the CPU6 so that the CPU6 operates in accordance with the changed mode (S296).

FIG. 32 is a continuation of the flow chart from FIG. 33. After the process of S296 of FIG. 33 is performed, if the number of copies is to be changed (in the case of Yes in S297), data to change the frequency of reading data out from memory is transmitted to the CPU6 so that the CPU6 operates in accordance with the changed mode (S298). If the sorting mode is to be changed (in the case of Yes in S299), data to change the destination of discharged paper is transmitted to the CPU8 so that the CPU8 operates in accordance with the changed mode (S300). Thereafter, sequence control corresponding to the other changed modes is conducted (S301) and the process returns to the beginning of the flow chart. The CPU4 and CPU6 follow commands from the CPU5. For example, under the control of the CPU5, the CPU4 changes the paper feed cassette and the CPU6 changes the timing, order, and frequency of reading the image data out of the memory.

Figure 35:
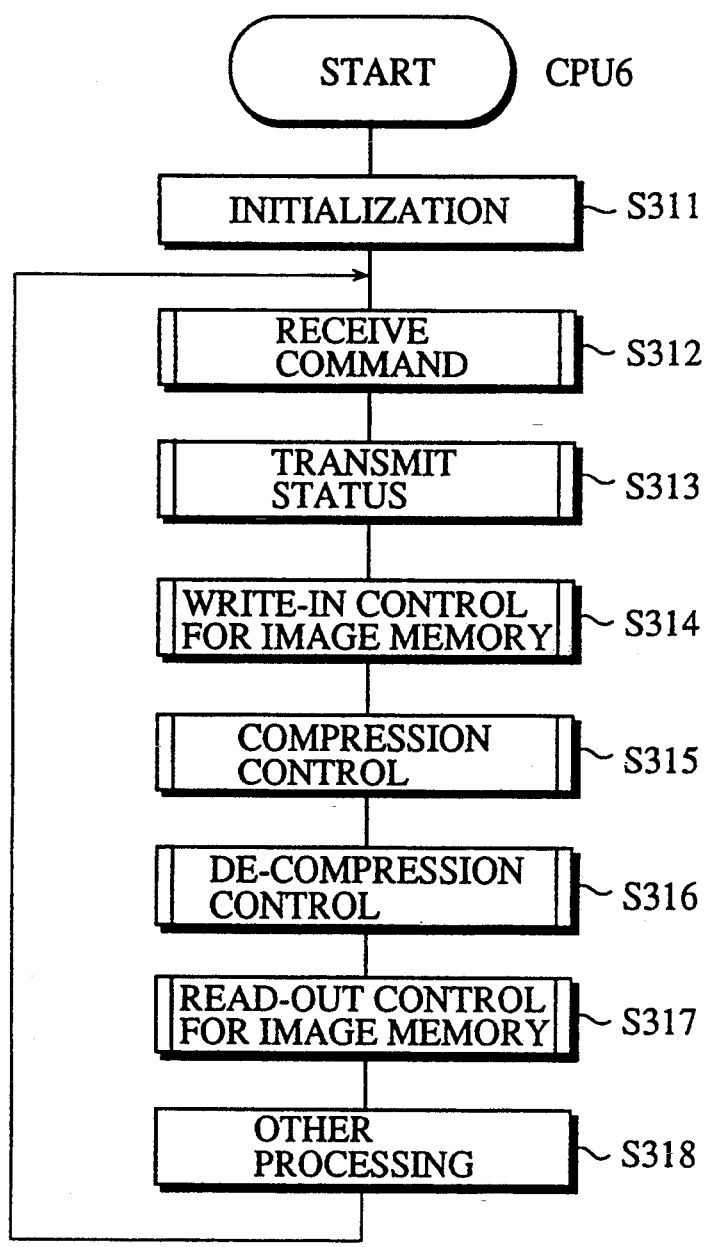
FIG. 35 is a flow chart showing a second embodiment of the main routine executed in the CPU6 of FIG. 7.

FIG. 35 is a flow chart showing a main routine executed in the CPU6 of FIG. 7. The CPU6 is for controlling the memory unit 30 of FIG. 1, and first performs initialization (S311). Subsequently, the CPU6 performs the process of receiving commands from other CPUs (S312), process of transmitting the status (S313), write-in control for the image memory 304 (S314), compression control (S315), de-compression control (S316), read-out control for the image memory 304 (S317), and other processing (S318).

Figure 36:
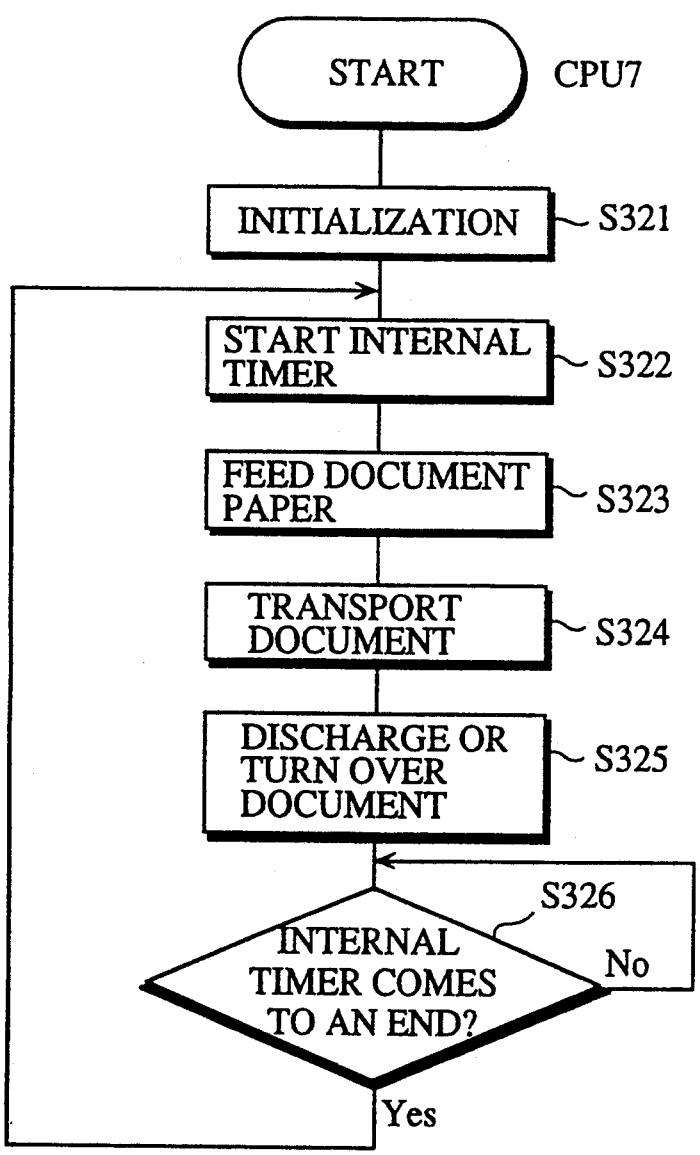
FIG. 36 is a flow chart showing a second embodiment of the main routine executed in the CPU7 of FIG. 8.

FIG. 36 is a flow chart showing a main routine executed in the CPU7 of FIG. 8. The CPU7 is for controlling the document transporter 500 of FIG. 1. The CPU7 first performs initialization (S321) and then starts its internal timer so as to make sure that the routine is executed in a specific period of time (S322). Subsequently, the CPU7 performs a document feed process of sweeping the document so that its deviation from the due position is corrected and of transporting the document to the conveyor belt 506 (S323), a document transport process of placing the document in a specified position for reading and transporting the document to the turn over belt 507 by the conveyor belt 506 (S324), and a document turn over and discharge process of discharging the document which has reached the turn over roller 507 or transporting it to the conveyor belt 506 again (S325). If the CPU7 confirms the end of the internal timer (in the case of Yes in S326), it returns to S322 and starts the internal timer again.

Figure 37:
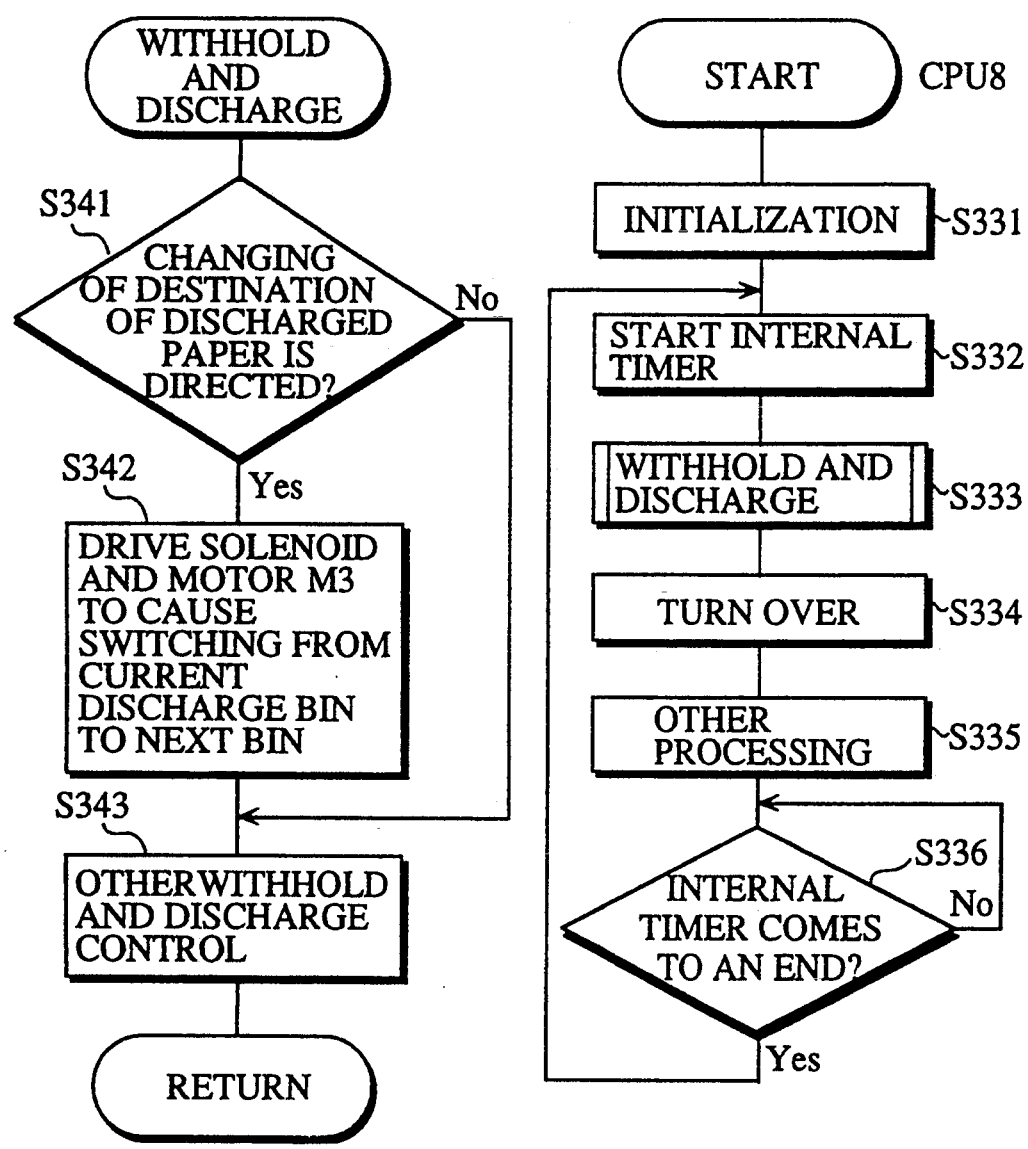
FIG. 37 is a flow chart showing a second embodiment of a main routine executed in the CPU8 of FIG. 8 and the control of withholding and discharging paper conducted therein.

FIG. 37 is a flow chart showing a main routine executed in the CPU8 of FIG. 8 and the control of withholding and discharging paper conducted therein. The CPU8 is for controlling the paper refeeder 600 of FIG. 1. The CPU8 first performs initialization (S331) and then starts its internal timer so that the routine is executed in a specified period of time (S332). Subsequently, the CPU8 performs a withhold and discharge process of withholding the paper with its one side printed which has been discharged from the image formation system 70 in order to print the other side thereof or discharging it to the discharge tray 701 (S333), a turn over process of turning over the paper being withheld (S334), and other processing (S335). If the CPU8 confirms the end of the internal timer (in the case of Yes in S336), it returns to S332 and starts the internal timer again.

In the withhold and discharge process mentioned above, the CPU8 confirms whether there is a command to change the destination of discharged paper or not (S341). If there is a command (in the case of Yes in S341), the CPU8 drives the solenoid and the discharge bin switching motor M3 so as to switch the current discharge bin to the next bin (S342), conducts other withhold and discharge control (S343), and returns to the beginning of the flow chart.

Also in the withhold and discharge process, the discharging of paper from the image formation system 70 is detected by the discharge sensor SE62 disposed at the discharge hole of the image formation system 70. Accordingly, the transport roller 602 is rotated during the discharging and is stopped when a specified period of time has passed since the discharging was completed. In the turn over process mentioned above, the turn over roller 603 rotates in the due direction while the turn over sensor SE61 is detecting paper. When the turn over sensor SE61 is turned off, the turn over roller 603 has its rotating direction reversed and stops its rotation when a specified period time has passed thereafter.

Figure 38:
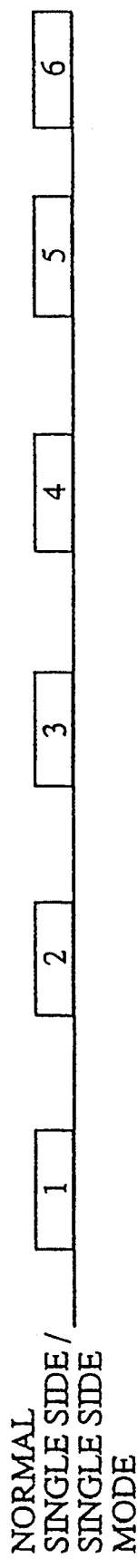
FIGS. 38(a), 38(b) and 38(c) are explanatory views illustrating the different orders of reading documents in a normal single side/single side mode, double side mode, and 2in-1 mode.
Figure 38:
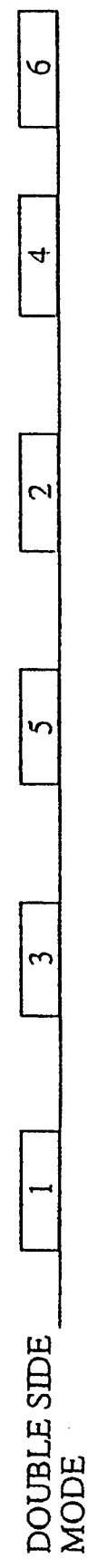
Figure 38:
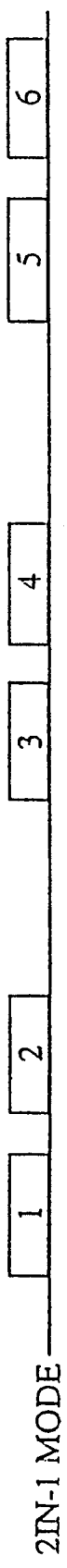

FIGS. 38(*a*), 38(*b*) and 38(*c*) are explanatory views illustrating different orders of reading the documents in the normal single side/single side mode, double side mode, and 2in-1 mode, respectively. As shown in the drawing, in the normal single side/single side mode, the documents are read out in the order of 1, 2, 3, 4, 5, and 6. In the double side mode, the documents are read out in the order of 1, 3, 5, 2, 4, and 6. In the 2in-1 mode, the documents 1 and 2, documents 3 and 4, and documents 5 and 6 are sequentially read out in combination. If more copies are required, the frequency of reading the documents is changed.

Below, there will be described the operation of the digital copier according to the present invention in the case where the copying mode thereof is changed after its copying operation was already started. In the digital copier, the operator sets a single or plurality of copying modes through the operation panel OP before the copying operation is started. After the setting of the copying modes, the CPU5 controls the CPUs 1 to 8 so as to perform the copying operation. In any copying operation including one using a single copying mode, the scanner is controlled in accordance with a memory mode or a mode using a memory and memory mode in combination. Consequently, the image data of all the documents is stored in the memory in any copying operation. In the case of the single copying mode, the mode using a memory and memory mode in combination is adopted, so that, if the copying mode is not changed after the copying operation was started, the memory is cleared immediately after the copying operation was completed or after a specified period of time has passed since the copying operation was completed.

In the digital copier, it is also possible to change the copying mode from the next copy onward during the copying operation. Then, the operator inputs a new mode such as a number of copies and presses the setting completion key 97. The inputted data is transmitted from the CPU1 to CPU5, where the data on the new mode is stored in the RAM 129 for the copying mode. After the current mode was completed, copying (printing) is initiated accordingly in the memory mode on the basis of the image data stored in the memory.

An embodiment of the digital copier according to the present invention has been described thus far. However, the memory function thereof is not limited to the built-in RAM shown in the embodiment. Instead of the built-in RAM, it is possible to use an external hard disk. As for the items to be set in changing the copying mode, it is also possible to add other items, such as the specification of job and the changing in position of the document sorting paper, thereto.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being concluded therein.

What is claimed is:

1. A digital copier being provided with a memory function, comprising:
   copying condition setting means for setting a plurality of copying conditions with respect to the same series of documents before copying operations are initiated;
   image forming means for forming images in accordance with the copying conditions being set;
   directing means for directing to start copying operations when said digital copier is not operated; and
   copying control means for controlling the copying operations so that the copying operations in accordance with the copying conditions being set are performed automatically in series, according to a directive directed by said directing means.

2. A digital copier being provided with a memory function, comprising:
   copying condition setting means for setting a plurality of copying conditions with respect to the same series of documents before copying operations are initiated;
   image forming means for forming images in accordance with the copying conditions being set;
   directing means for directing to start copying operations when said digital copier is not operated; and
   copying control means for controlling the copying operations so that the copying operations in accordance with the copying conditions being set are performed automatically in parallel with respect to each document in the same series of documents, according to a directive directed by said directing means.

3. A digital copier being provided with a memory function, comprising:
   copying condition setting means for setting copying conditions with respect to a series of documents before copying operations are initiated;
   image forming means for forming images in accordance with the copying conditions being set;
   directing means for directing to start copying operations when said digital copier is not operated;
   copying condition changing means for changing the copying conditions; and
   copying control means for controlling the copying operations so that the copying operations are performed in accordance with the copying conditions being set by said copying condition setting means with respect to the series of documents and that, when the copying conditions are changed during the copying operations, the copying operations are performed in accordance with the changed copying conditions with respect to the rest of the series of documents.

4. A digital copier as set forth in claim 3, wherein the copying condition changing means changes at least the number of copies among the copying conditions.

5. A digital copier as set forth in claim 4, wherein the copying condition changing means further changes the magnification for copying.

6. A digital copier as set forth in claim 5, wherein the copying condition changing means further changes the size of paper to be printed.

7. A digital copier as set forth in claim 6, wherein the copying condition changing means further changes the mode for sorting.

8. A digital copier being provided with a memory function, comprising:

copying mode setting means for setting a first copying mode and a second copying mode different from said first copying mode before copying operations are initiated;

copying mode storing means for storing the first and second copying modes being set;

image forming means for forming images in accordance with the first and second copying mode being set;

directing means for directing to start copying operations when said digital copier is not operated; and copying control means for controlling copying operations so that the copying operations in accordance with the first copying mode being stored are performed according to a directive directed by said directing means and that the copying operations in accordance with the second copying mode being stored are performed continually and automatically after the copying operations in accordance with the first copying mode are completed.

* * * * *